(12) United States Patent
Brailovskiy et al.

(10) Patent No.: US 10,013,763 B1
(45) Date of Patent: Jul. 3, 2018

(54) INCREASING FIELD OF VIEW USING MULTIPLE DEVICES

(71) Applicant: Amazon Technologies, Inc., Seattle, WA (US)

(72) Inventors: Ilya Vladimirovich Brailovskiy, Mountain View, CA (US); Paul Berenberg, Los Altos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 309 days.

(21) Appl. No.: 14/867,194

(22) Filed: Sep. 28, 2015

(51) Int. Cl.
*H04N 5/00* (2011.01)
*G06T 7/00* (2017.01)
*H04N 5/232* (2006.01)

(52) U.S. Cl.
CPC ....... *G06T 7/0024* (2013.01); *H04N 5/23232* (2013.01); *H04N 5/23238* (2013.01); *G06T 2200/32* (2013.01)

(58) Field of Classification Search
CPC ............ H04N 5/23232; H04N 5/23238; G06T 2200/32

USPC .......................................................... 348/36
See application file for complete search history.

(56) References Cited

U.S. PATENT DOCUMENTS

2014/0245367 A1* 8/2014 Sasaki ............... H04N 21/4402
725/109

* cited by examiner

*Primary Examiner* — Jeffery Williams
(74) *Attorney, Agent, or Firm* — Pierce Atwood LLP

(57) ABSTRACT

Devices, systems and methods are disclosed for improving a field of view of video data by combining video data from multiple image capture devices. For example, video data from a first image capture device and a second image capture device located above or below the first image capture device may be combined to increase a field of view. The boundary between the first video data and the second video data may be determined based on objects visible in the video data. In addition, if the first image capture device and the second image capture device include two or more cameras, the vertical overlap between the first image capture device and the second image capture device may be used to horizontally stitch video data from the two or more cameras.

20 Claims, 22 Drawing Sheets

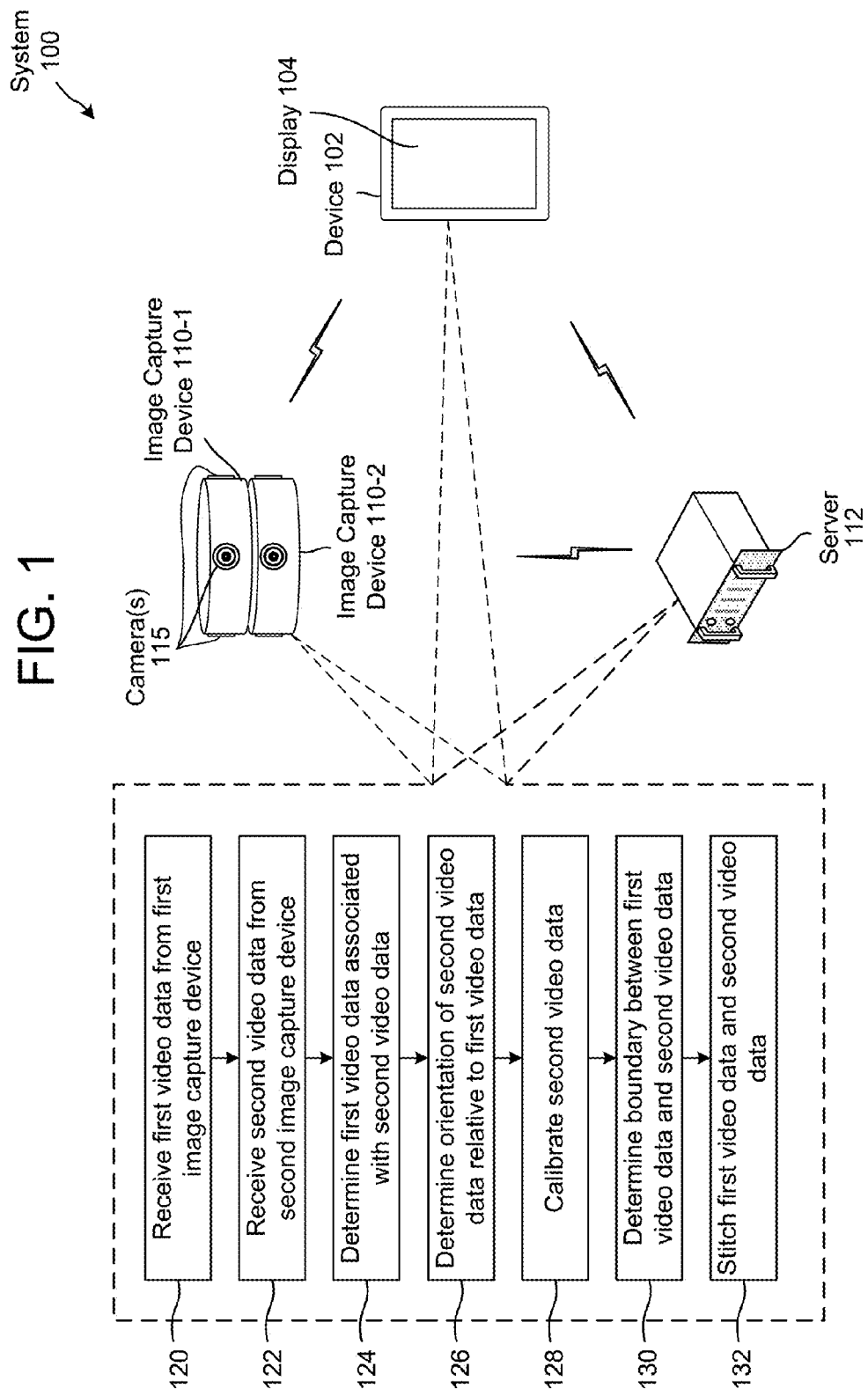

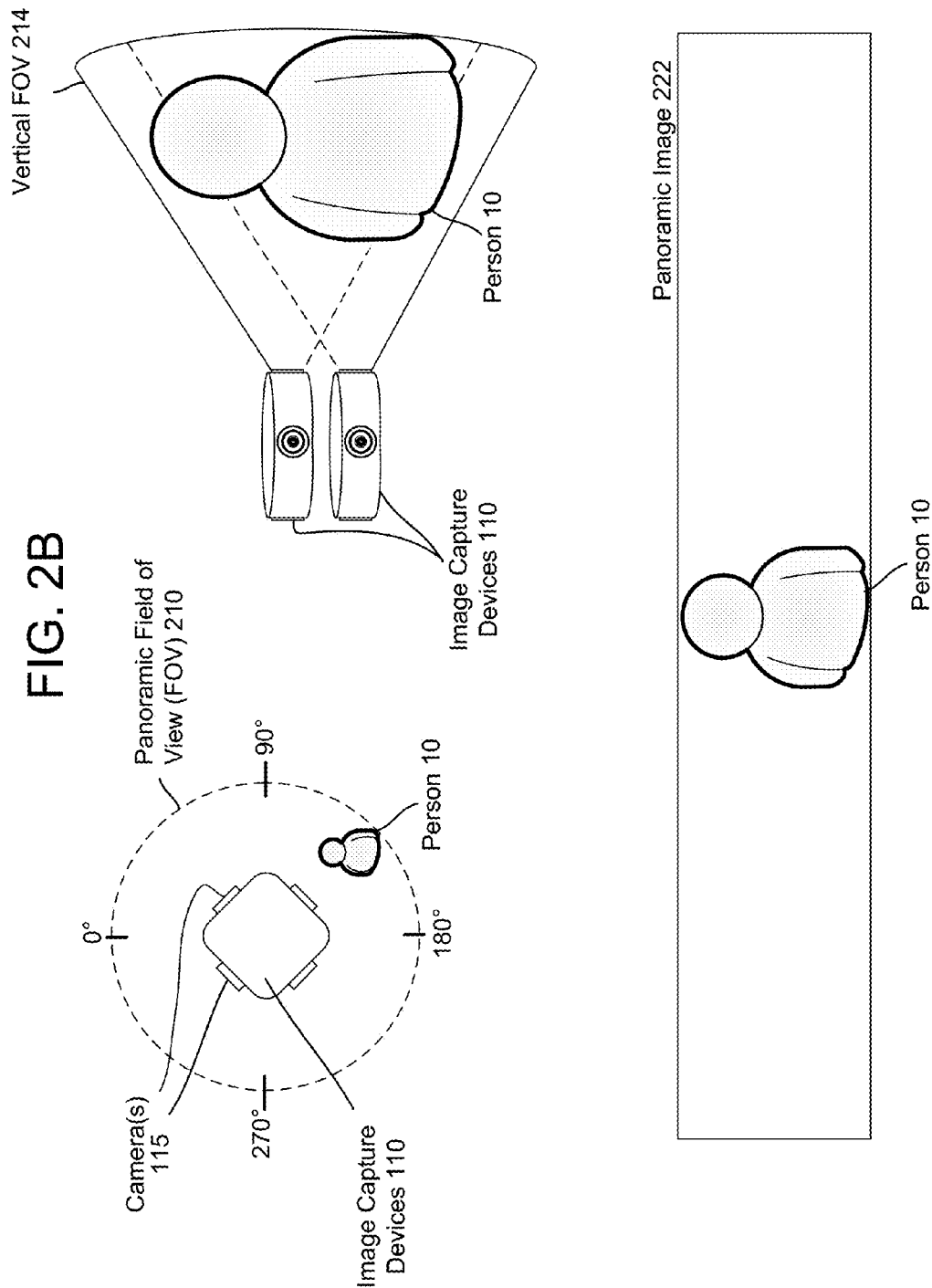

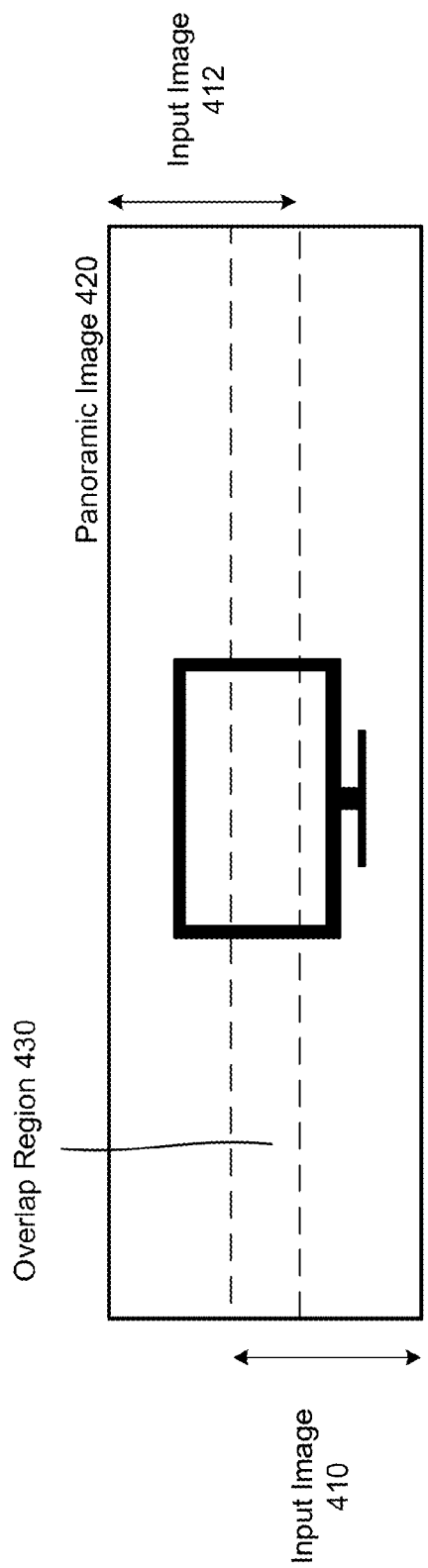

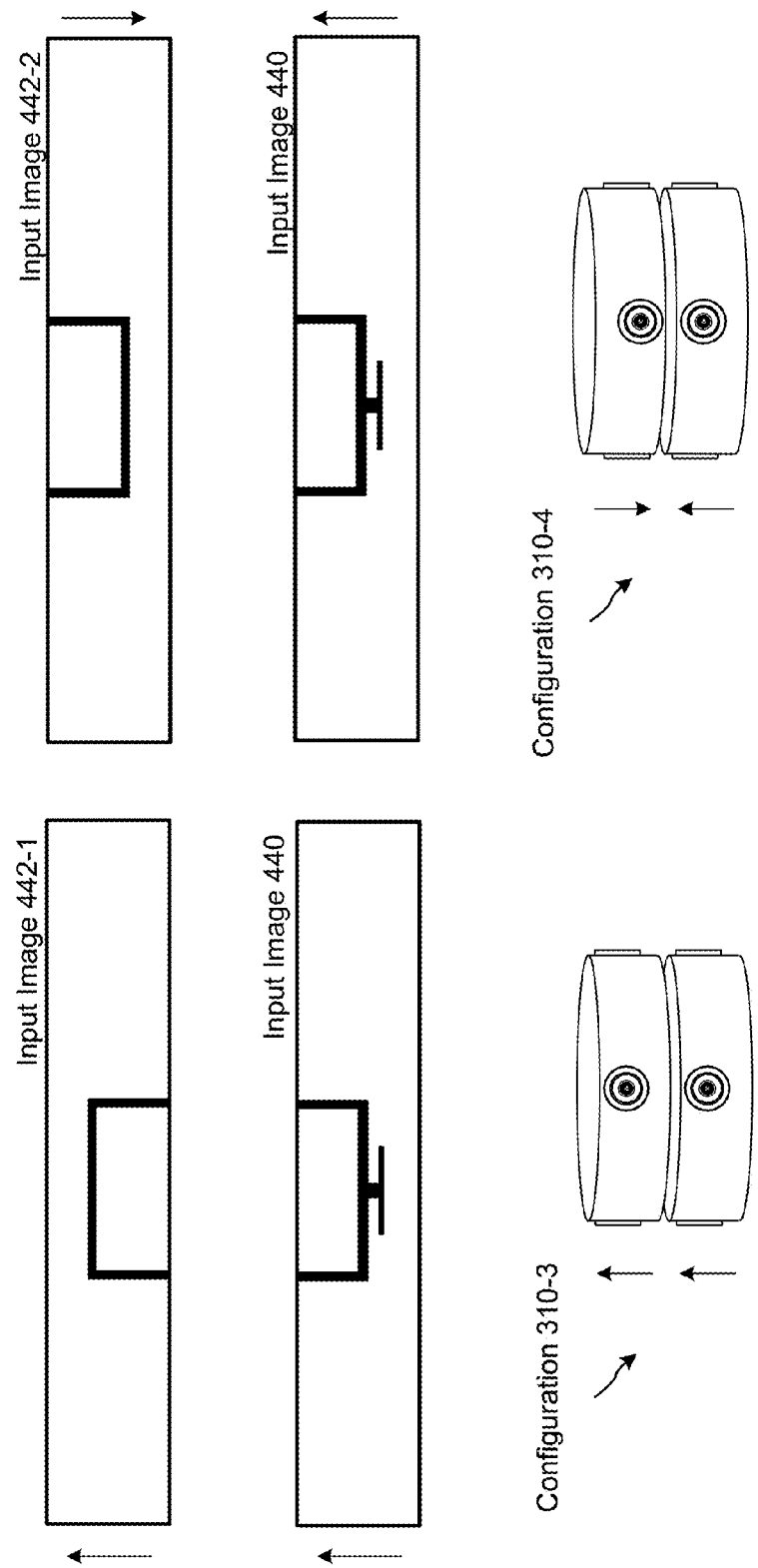

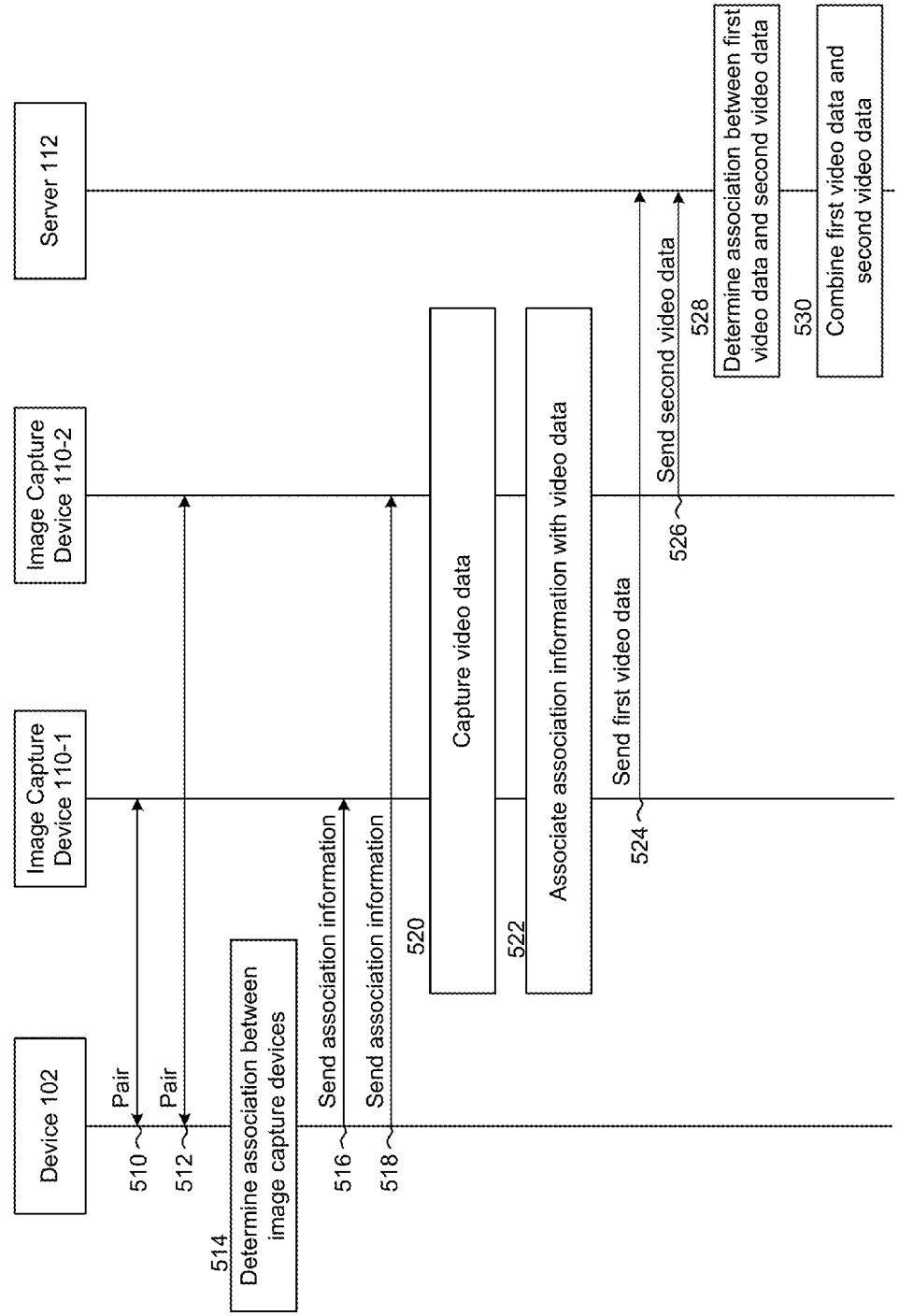

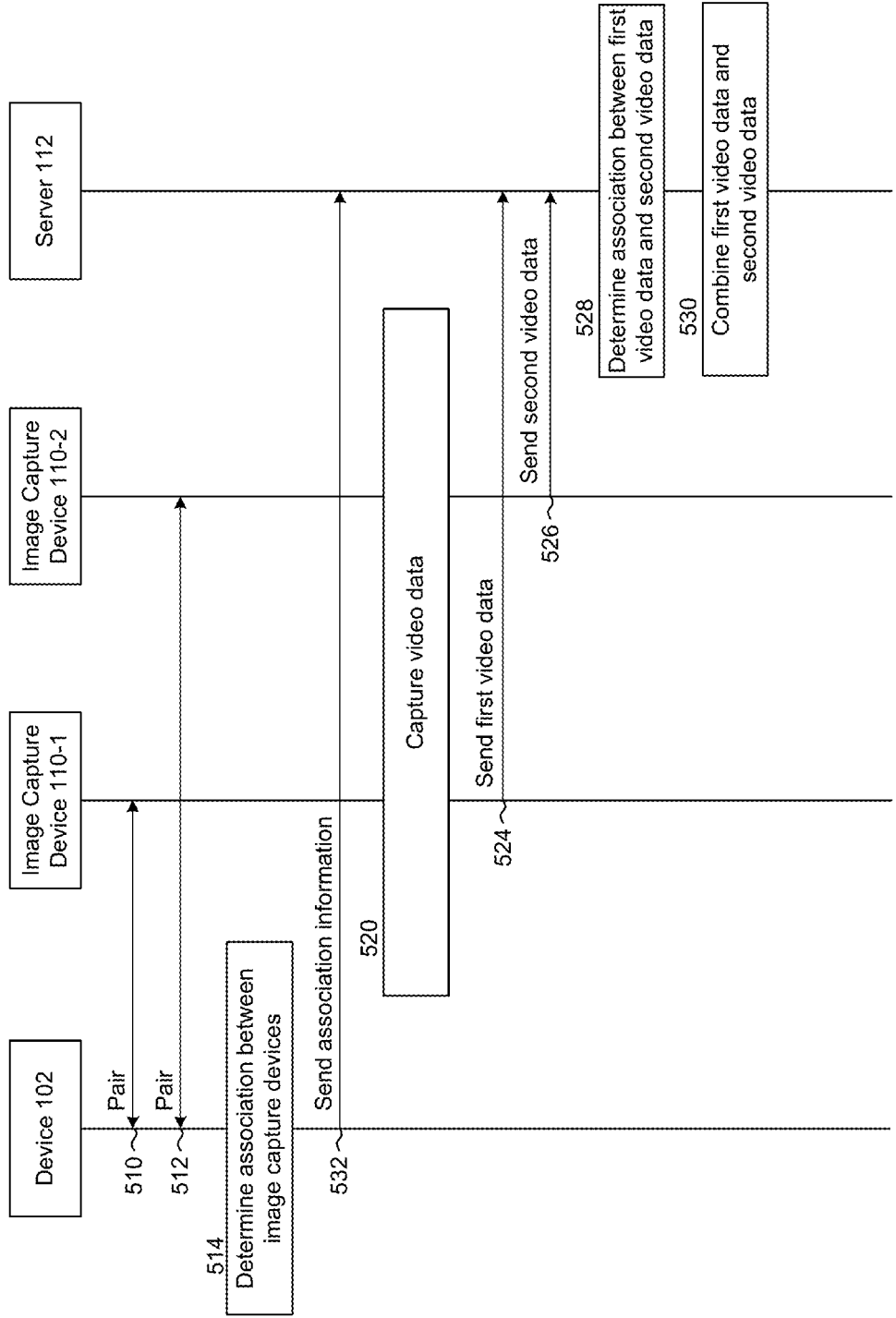

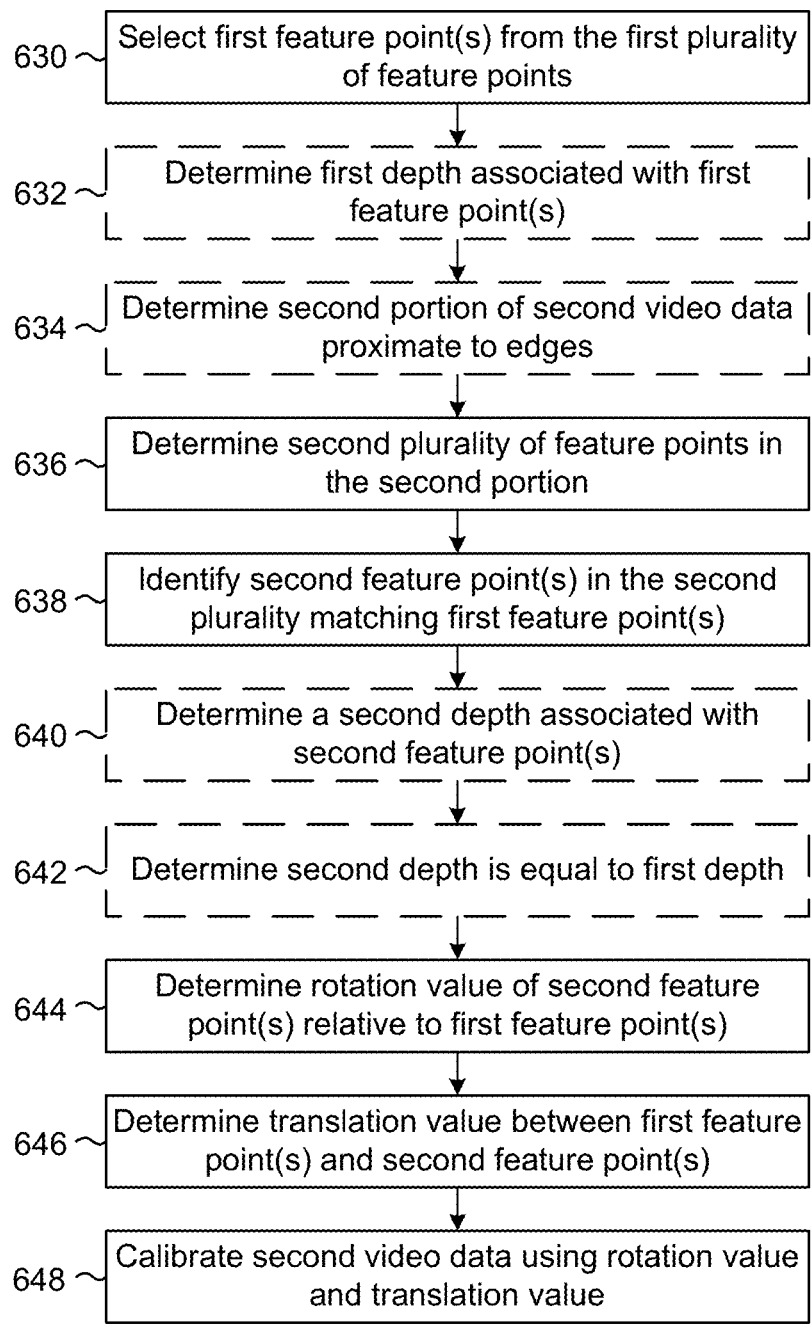

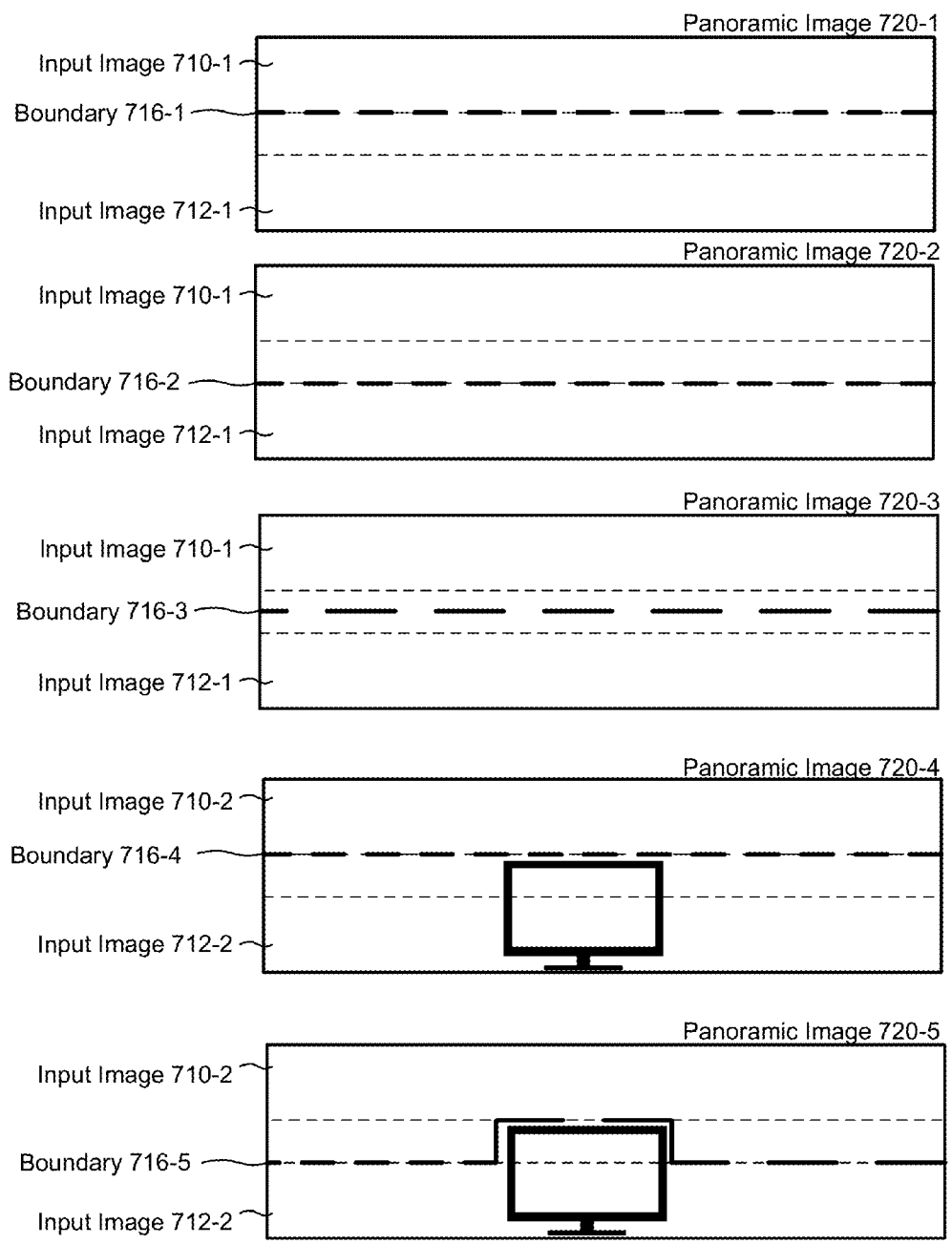

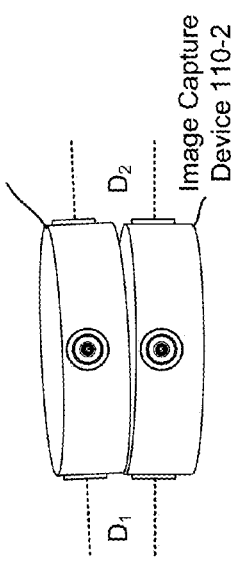
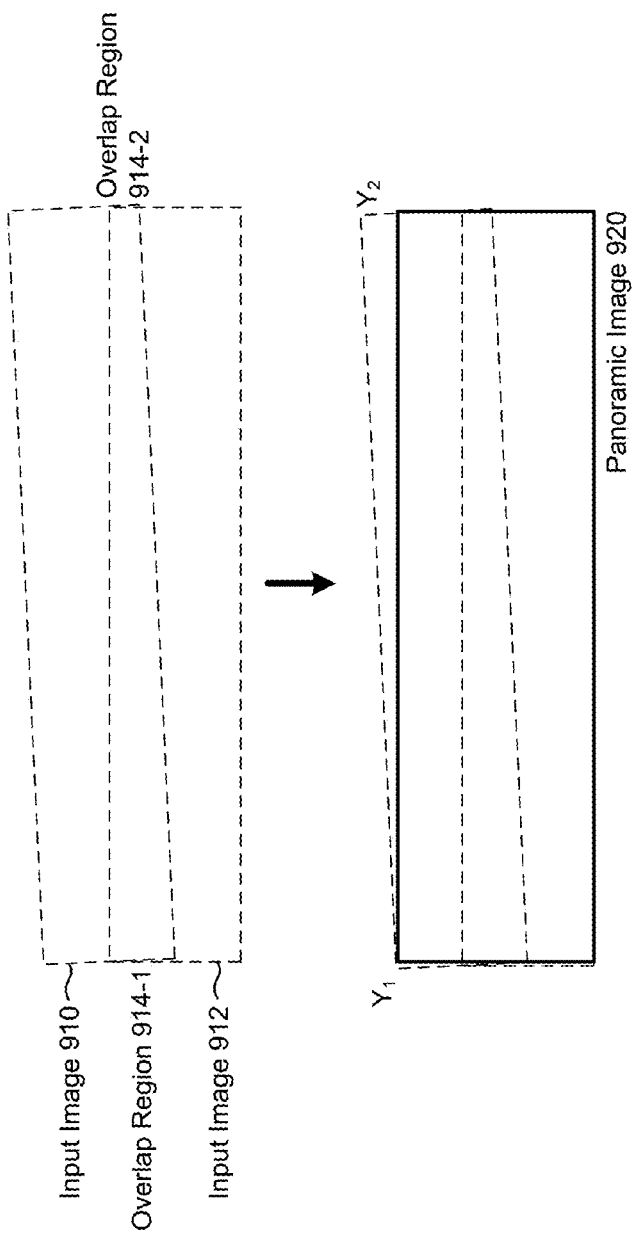
FIG. 9

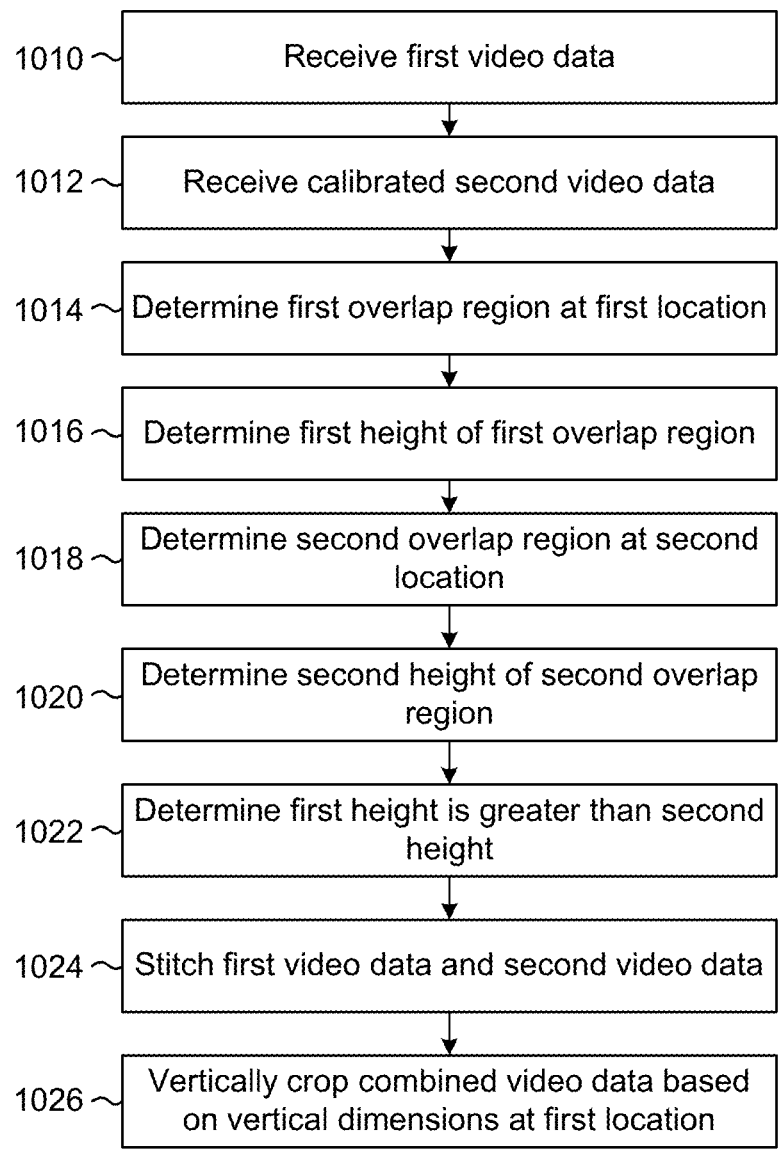

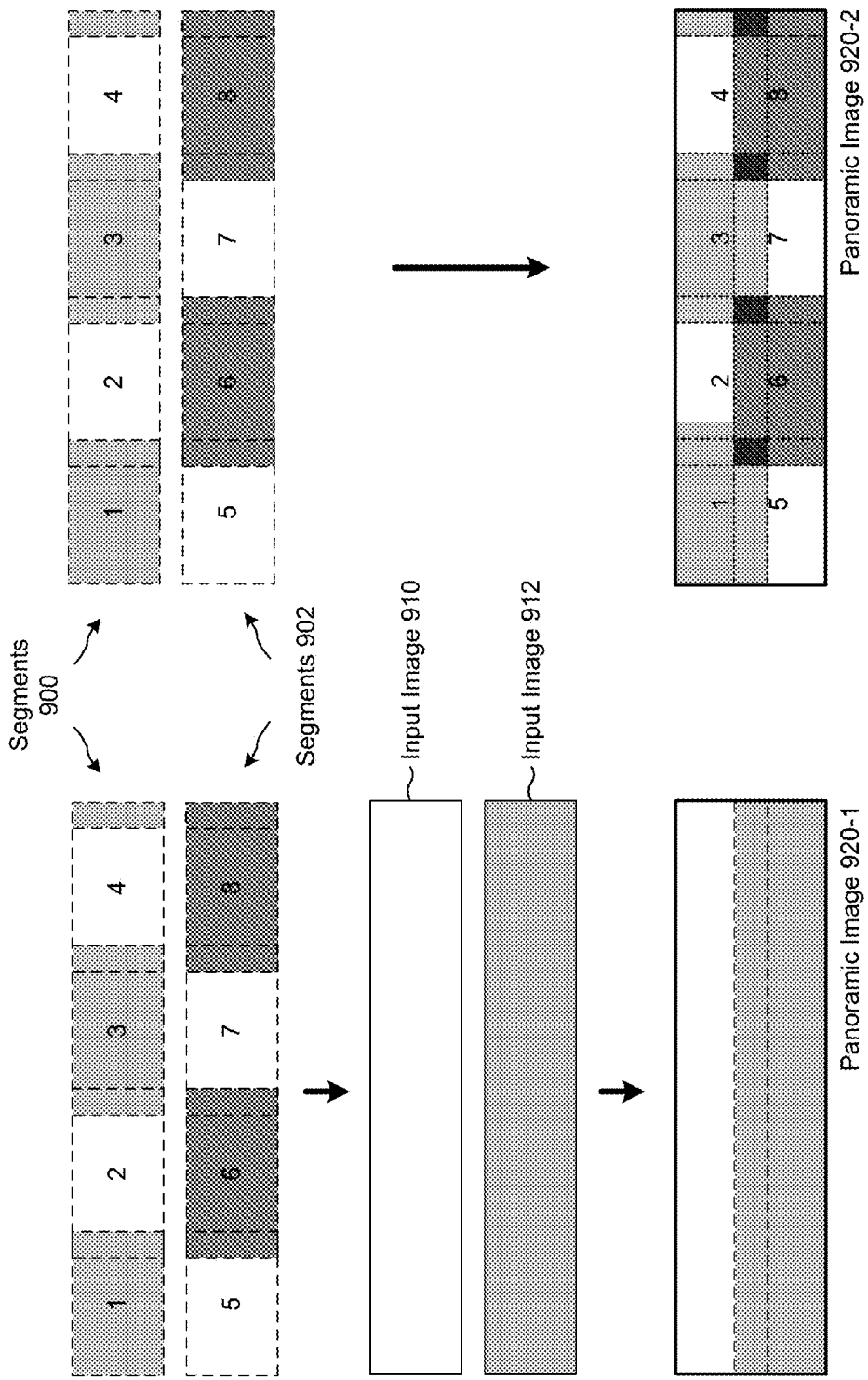

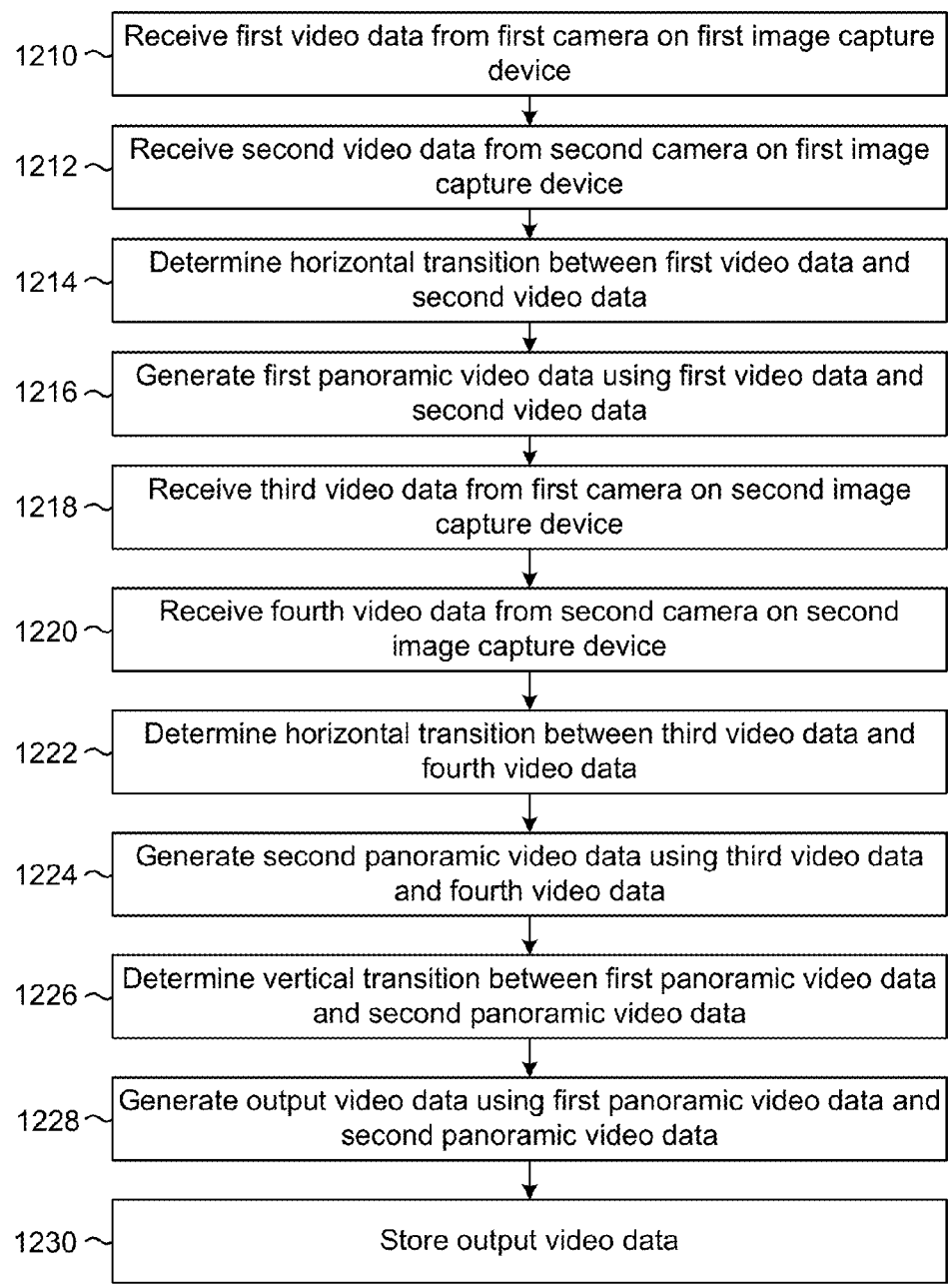

INCREASING FIELD OF VIEW USING MULTIPLE DEVICES

BACKGROUND

With the advancement of technology, the use and popularity of electronic devices has increased considerably. Electronic devices are commonly used to capture videos. Disclosed herein are technical solutions to improve a field of view of the resulting videos.

BRIEF DESCRIPTION OF DRAWINGS

For a more complete understanding of the present disclosure, reference is now made to the following description taken in conjunction with the accompanying drawings.

FIG. 1 illustrates an overview of a system for increasing a field of view using multiple devices according to embodiments of the present disclosure.

FIGS. 2A-2B illustrate examples of field of views captured by image capture devices according to embodiments of the present disclosure.

FIGS. 4A-4C illustrate examples of determining an orientation of video data from image capture devices according to embodiments of the present disclosure.

FIGS. 5A-5C are communication diagrams and flowcharts conceptually illustrating example methods for determining video data from image capture devices is associated according to embodiments of the present disclosure.

FIGS. 6A-6B illustrate examples of calibrating video data between image capture devices according to embodiments of the present disclosure.

FIG. 7 illustrates examples of determining boundaries between overlapping video data according to embodiments of the present disclosure.

FIG. 9 illustrates an example of misalignment between image capture devices according to embodiments of the present disclosure.

FIG. 10 is a flowchart conceptually illustrating an example method for cropping combined video data to remove skew according to embodiments of the present disclosure.

FIGS. 11A-11B illustrate examples of combining video data according to embodiments of the present disclosure.

FIGS. 12A-12B are flowcharts conceptually illustrating example methods for combining video data according to embodiments of the present disclosure.

DETAILED DESCRIPTION

Figure 2A:
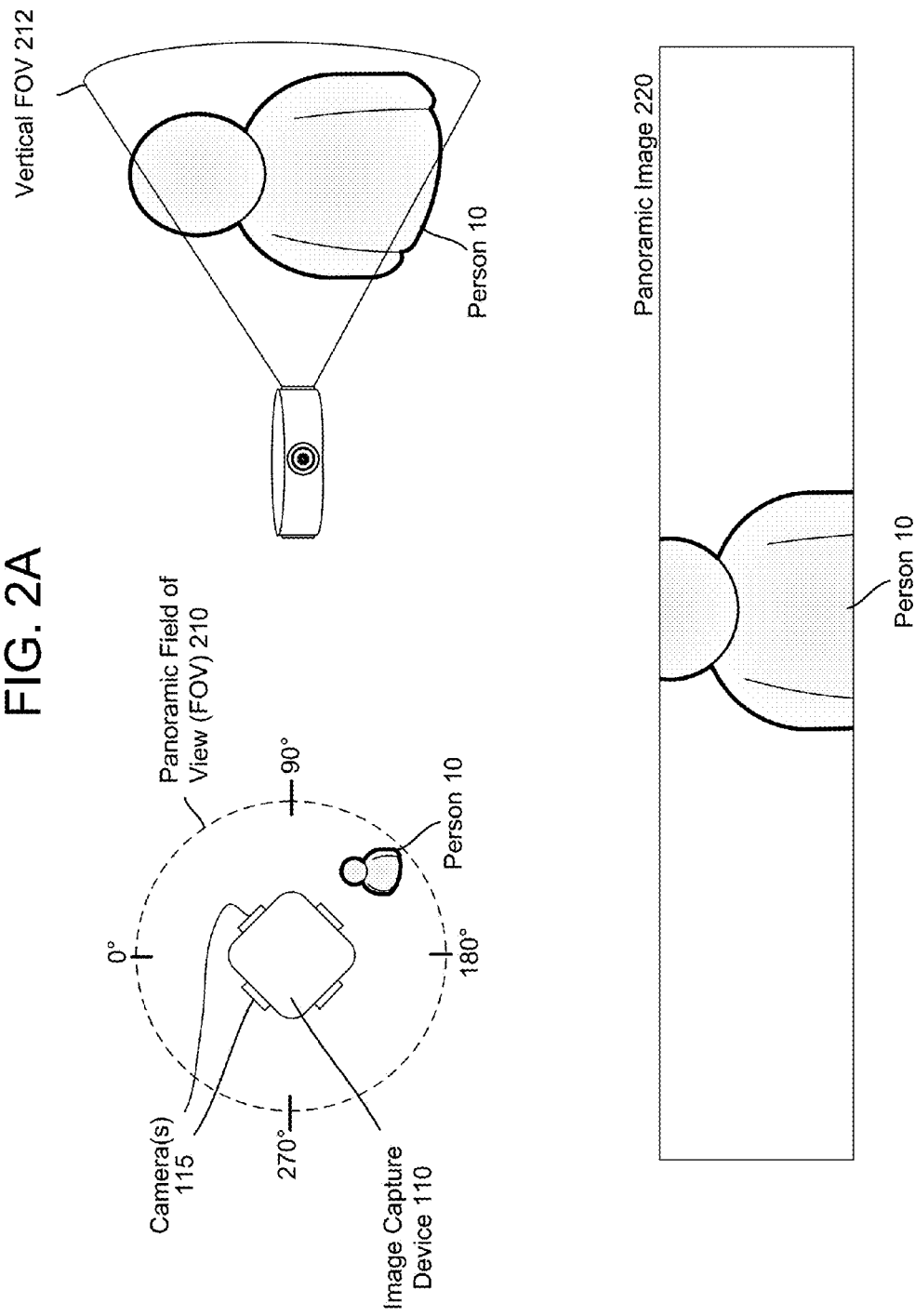

Electronic devices are commonly used to capture image/video data using one or more cameras. While the video data may include a wide horizontal field of view in order to capture a wide area, a vertical field of view may be limited. Due to the limited vertical field of view, a top and/or bottom of a subject may be omitted from the video data. For example, the limited vertical field of view may omit portions of a small room or an object located near the one or more cameras.

To improve a vertical field of view, devices, systems and methods are disclosed that generate output video data by stitching video data from multiple image capture devices. For example, a first image capture device may capture a first vertical field of view and a second image capture device may be located above or below the first image capture device and capture a second vertical field of view. By stitching the video data from the first image capture device and the second image capture device, the output video data may include a third (i.e., combined) vertical field of view including the first vertical field of view and the second vertical field of view. In addition, if the first image capture device and the second image capture device include two or more cameras, the vertical overlap between the first image capture device and the second image capture device may be used to horizontally stitch video data from the two or more cameras.

FIG. 1 illustrates an overview of a system 100 for implementing embodiments of the disclosure. The system 100 includes a first image capture device 110-1, a second image capture device 110-2, a device 102, and a server 112 all in communication with each other. While the following descriptions refer to the server 112 performing steps illustrated in the drawings, the device 102 and/or the image capture devices 110 may perform any or all of the steps without departing from the present disclosure. Thus, the operations described below may be executed by a combination of components including the device 102, the image capture devices 110 and/or the server 112. As illustrated in FIG. 1, the device 102 may include a display 104 that may display video data captured by one or more camera(s) 115 of the image capture devices 110.

The server 112 may receive (120) first video data from a first image capture device 110-1 and may receive (122) second video data from a second image capture device 110-2. The server 112 may determine (124) that the first video data is associated with the second video data, as will be discussed in greater detail below. For example, the server 112 may determine that the first video data is associated with the second video data due to association information indicating that the first video data is associated with the second video data. In other examples, the server 112 may determine that the first image capture device 110-1 is associated with the second image capture device 110-2 due to association information and may associate the first video data with the second video data based on the association of the first image capture device 110-1 and the second image capture device 110-2. However, the present disclosure is not limited thereto and the server 112 may determine that the image capture devices are associated using other techniques known to one of skill in the art or described below.

The server 112 may determine (126) an orientation of the second video data relative to the first video data. In some examples, the server 112 may determine a first region of the first video data, such as a border region in proximity to a border of the first video data. The server 112 may determine a first feature point (e.g., a recognizable pattern of pixels) in the first portion and/or the first video data and may determine a matching second feature point in the second video data using a structural similarity (SSIM) index or the like.

The server 112 may calibrate (128) the second video data, such as by translating individual pixel values to align the second video data with the first video data. The second video data may be calibrated using an offset, which may include a rotation value (e.g., rotation offset value), a translation value, whether the second video data is inverted or the like, as discussed in greater detail below with regard to FIGS. 4A-4C. In some examples, multi-camera extrinsic parameters calibration could be performed using a bundle adjustment optimization method relying on certain a priori known epipolar constrains (e.g., camera planes are parallel to each other, rotation of one camera relative to another is limited to certain angle, etc.). The server 112 may determine (130) a boundary between the first video data and the second video data and may stitch (132) the first video data and the second video data using techniques known to one of skill in the art.

The image capture device 110 may capture the video data using the one or more camera(s) 115. For example, the image capture device 110 may capture a field of view of 360 degrees using a plurality of cameras. In some examples, the plurality of cameras may have a fixed spacing, such as four cameras spaced at 90 degree intervals or six cameras spaced at 60 degree intervals. However, the present disclosure is not limited thereto and the plurality of cameras may be located unevenly depending on the image capture device 110. In addition, the image capture device 110 may capture a field of view less than 360 degrees without departing from the present disclosure. In some examples, the image capture device 110 may capture the video data using a single camera without mirrors (e.g., a single camera spinning in a circle), a single camera using a plurality of mirrors, a plurality of cameras and a plurality of mirrors and/or a plurality of cameras without mirrors. Thus, the present disclosure is not limited to a specific image capture device 110.

The video data may include a plurality of video frames (e.g., sequence of image frames, each image frame associated with a particular time) and the device 102 may display a portion of the video data on the display 104 associated with a position (e.g., x and y pixel coordinates within a frame of video data) of an object (e.g., a face) within the video data. Thus, the device 102 may not display the entirety of the video data and dimensions of the displayed video data may be smaller than dimensions of the video frame, in some examples significantly smaller. For example, the video data may include multiple directions and the portion of the video data displayed on the device 102 may include a single direction associated with a subject or other object of interest. However, the present disclosure is not limited thereto and the video data displayed on the device 102 may be the entirety of the video data without departing from the present disclosure.

The video data may be generated using one camera or a plurality of cameras and may have an aspect ratio exceeding 2:1. An aspect ratio is a ratio of one dimension of a video frame to another dimension of a video frame (for example height-width or width-height). For example, a video frame having a resolution of 7680 pixels by 1080 pixels corresponds to an aspect ratio of 64:9 or more than 7:1. While the video data may have a certain aspect ratio (for example 7:1 or other larger than 2:1 ratio) and may be considered panoramic video data due to a panoramic/360 degree nature of the incoming video data (Which may result from a single panoramic camera or multiple images taken from multiple cameras combined to make a single frame of the panoramic video data), the portion of the panoramic video data displayed on the display 104 may have an aspect ratio that is likely to be used on a viewing device. As a result, an aspect ratio of the portion of the panoramic video data displayed on the display 104 may be lower than 2:1. For example, the cropped image 12 may have a resolution of 1920 pixels by 1080 pixels (e.g., aspect ratio of 16:9), a resolution of 1140 pixels by 1080 pixels (e.g., aspect ratio of 4:3) or the like. In addition, the resolution and/or aspect ratio of the displayed video data may vary based on user preferences. Similarly, an aspect ratio of output video data (e.g., a video summarization) may be lower than 2:1, as the output data is intended to be displayed on a display.

Pixel coordinates may specify a position within a video frame. For example, if the video frame has a resolution of 7680 pixels by 1080 pixels, a pixel coordinate of a bottom left pixel in the video frame may have pixel coordinates of (0, 0), a pixel coordinate of a top left pixel in the video frame may have pixel coordinates of (0, 1080), a pixel coordinate of a top right pixel in the video frame may have pixel coordinates of (7680, 1080) and a bottom right pixel in the video frame may have pixel coordinates of (7680, 0). Similarly, if the displayed video frame has a resolution of 1920 pixels by 1080 pixels, a pixel coordinate of a bottom left pixel in the displayed video frame may have pixel coordinates of (0, 0) in the video frame, a pixel coordinate of a top left pixel in the displayed video frame may have pixel coordinates of (0, 1080) in the video frame, a pixel coordinate in a top right pixel in the displayed video frame may have pixel coordinates of (1920, 1080) in the video frame and a bottom right pixel in the displayed video frame may have pixel coordinates of (1920, 0) in the video frame.

After being stitched together, the output video data may be used to generate a video summarization. The video summarization may summarize lengthy video data (e.g., an hour of recording) in a short video summary (e.g., 2-5 minutes) highlighting the interesting events that occurred in the video data. Therefore, each video segment in the video summary may be relatively short (e.g., between 5-60 seconds). As part of generating the video summarization, the device 102 may display the output video data and may request input from a user of the device 102. For example, the user may instruct the device 102 to generate additional video data (e.g., create an additional video clip), to increase an amount of video data included in the output video data (e.g., change a beginning time and/or an ending time to increase or decrease a length of the output video data) or the like. Thus, the server 112 may generate the output video data, the device 102 may display the output video data to the user and receive feedback from the user and the server may generate additional or different output video data based on the user input. The stitched output video data may be similarly modified by the user during a video editing process.

FIGS. 2A-2B illustrate examples of field of views captured by image capture devices according to embodiments of the present disclosure. As illustrated in FIG. 2A, an image capture device 110 may capture video data having a panoramic field of view (FOV) 210 of up to 360 degrees. The video data may include a person 10, but a vertical FOV 212 may be limited and portions of the top and bottom of the person 10 may be cut off or omitted from the video data, as illustrated by panoramic image 220.

In contrast, FIG. 2B illustrates multiple image capture devices 110 capturing video data having the panoramic FOV 210 along with an increased vertical FOV 214. By stitching video data from the image capture devices 110, the vertical FOV 214 is increased to include the portions of the top and bottom of the person 10 that were cut off or omitted from the panoramic image 220, as illustrated by panoramic image 222. The vertical FOV 214 may be increased by spacing the image capture devices 110 apart, by including additional image capture devices 110 and/or by positioning the camera(s) 115 within the image capture devices 110, as illustrated in FIG. 3.

While FIG. 2B illustrates the vertical FOV increasing, the present disclosure is not limited thereto. For example, an orientation of the vertical and horizontal axis is based on a direction of the panorama (e.g., longitudinal direction) captured by the image capture device 110. Therefore, the image capture devices 110 may be oriented in various configurations and the techniques disclosed in the present disclosure may be used to increase a FOV captured by the image capture devices. In addition, the techniques may be used to increase a horizontal and/or vertical FOV for non-panoramic video data without departing from the present disclosure.

Figure 3:
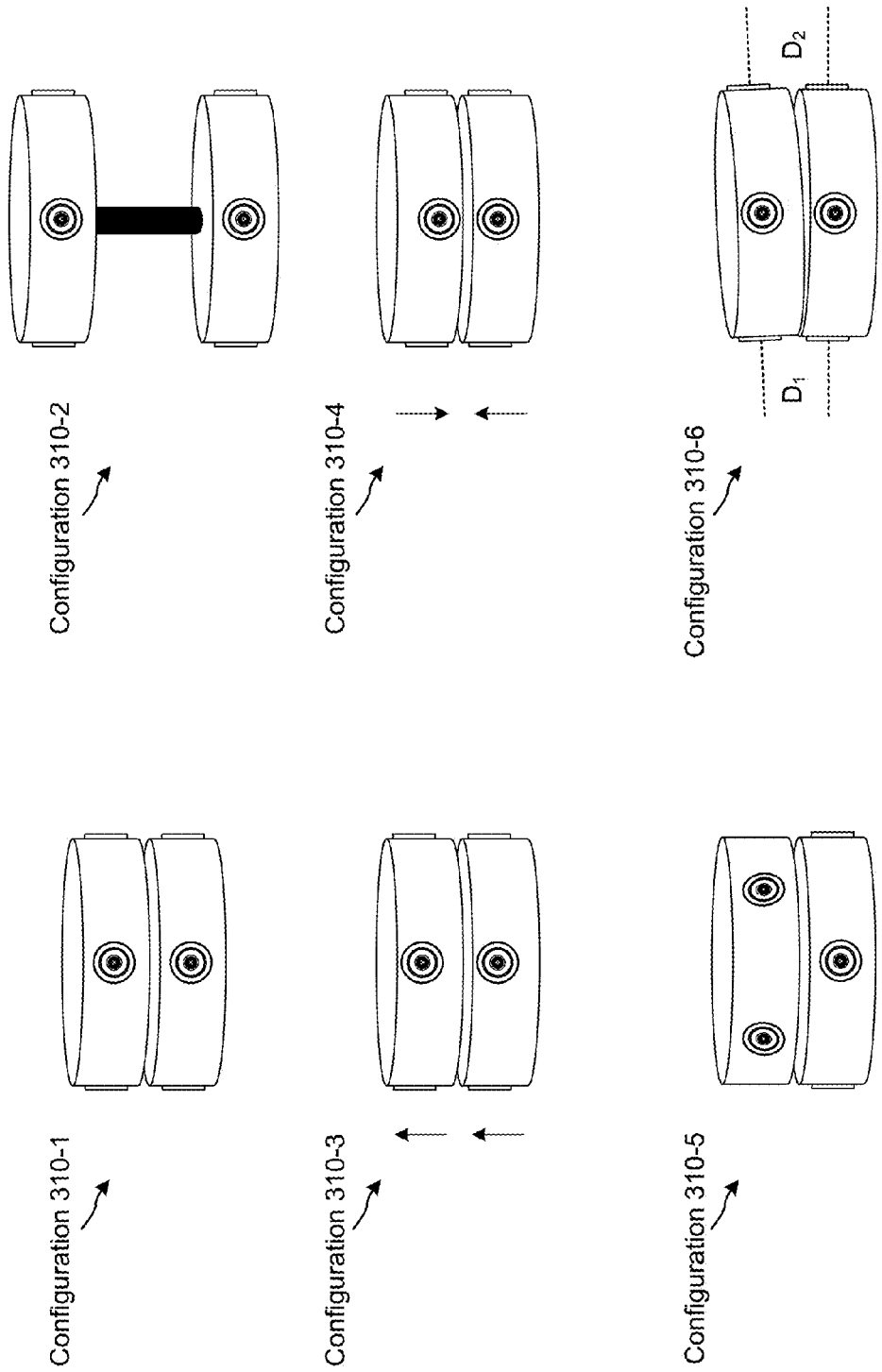
FIG. 3 illustrates examples of configurations for multiple image capture devices according to embodiments of the present disclosure.

FIG. 3 illustrates examples of configurations for multiple image capture devices according to embodiments of the present disclosure. As illustrated in FIG. 3, a first configuration 310-1 may include stacked image capture devices 110. For example, the image capture devices 110 may be physically connected (e.g., attached to each other, mounted to each other or the like) in close proximity. The camera(s) 115 in the first configuration 310-1 are positioned in a center of the image capture devices 110, although the present disclosure is not limited thereto. As illustrated in FIG. 3, a second configuration 310-2 may include multiple image capture devices 110 physically attached at a distance. For example, the image capture devices 110 may be physically connected to an apparatus that separates the image capture devices 110 by a desired distance to increase the vertical FOV.

As illustrated in FIG. 3, a third configuration 310-3 and a fourth configuration 310-4 may include camera(s) 115 positioned off-center. For example, the image capture devices 110 may include camera(s) 115 positioned above center or facing upwards. In the third configuration 310-3, both image capture devices 110 are oriented in the same direction, increasing the vertical FOV and decreasing an overlap between the image capture devices 110. Due to the reduced overlap, the third configuration 310-3 may increase the vertical FOV at the expense of increasing a difficulty of calibrating and stitching the video data. In contrast, in the fourth configuration 310-4 the image capture devices 110 are oriented in opposite directions (e.g., one image capture device 110 is oriented upside down), increasing the overlap between the image capture devices (and therefore decreasing a difficult of calibrating and stitching the video data) at the expense of decreasing the vertical FOV relative to the third configuration 310-3.

As illustrated in FIG. 3, a fifth configuration 310-5 may include camera(s) 115 offset (e.g., not aligned) between the image capture devices 110. Thus, the top image camera device 110 may be oriented so that the camera(s) 115 in the top image capture device 110 are situated between the camera(s) 115 in the bottom image capture device. For example, if the camera(s) 115 are spaced apart by 90 degrees, the top image capture device 110 may have an offset of 45 degrees relative to the bottom image capture device 110. However, the present disclosure is not limited thereto and the offset may vary without departing from the disclosure.

As will be discussed in greater detail below with regard to FIG. 9, a sixth configuration 310-6 may include a misalignment between the top image capture device 110 and the bottom image capture device 110. For example, the misalignment may result in cameras 115 in a first location being separated by a first distance $D_1$ while cameras 115 in a second location may be separate by a second distance $D_2$. This misalignment may occur due to multiple variables, such as an unstable base, improper mounting, manufacturing defect or the like. However, the server 112 may compensate for the misalignment as part of calibrating the second video data.

While FIG. 3 illustrates configurations 310, the present disclosure is not limited thereto. Instead, the present disclosure may include various configurations not illustrated in FIG. 3, including additional image capture devices 110, image capture devices 110 with moveable camera(s) 115 or the like. In addition, while FIG. 3 illustrates the camera(s) 115 of the image capture devices 110 being aligned, the present disclosure is not limited thereto. Instead, top camera(s) 115 of a first image capture device 110 may be offset from bottom camera(s) 115 of a second image capture device 110 by various angles, such as 45 or 90 degrees. By offsetting the top camera(s) 115 from the bottom camera(s) 115, the stitched video data may offset boundaries (e.g., seams or transitions between the camera(s) 115) and in some examples, may use the overlapping video data to assist in the stitching process.

Figure 4C:
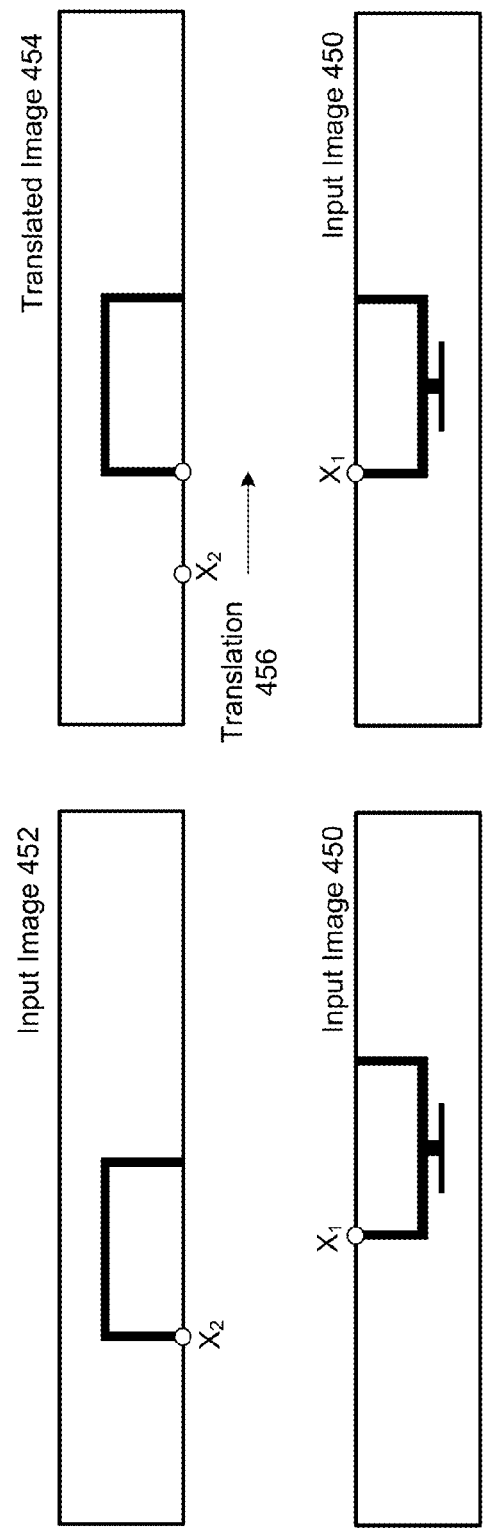

FIGS. 4A-4C illustrate examples of determining an orientation of video data from image capture devices according to embodiments of the present disclosure. As illustrated in FIG. 4A, a first input image 410 may be stitched together (i.e., combined) with a second input image 412 to generate a panoramic image 420. The video data included in both the first input image 410 and the second input image 412 is indicated as the overlap region 430, which may be used to determine an orientation of the video data from the image capture devices and calibrate the image capture devices. Calibrating the image capture devices may refer to determining offset values to align the second input image 412 with the first input image 410 in order to stitch the first input image 410 and the second input image 412 to generate the panoramic image 420.

FIG. 4B illustrates determining an orientation of the image capture devices 110 and/or the video data captured by the image capture devices 110. As illustrated in FIG. 4B, the image capture devices 110 are oriented in the same direction in the third configuration 310-3. Therefore, bottom input image 440 and first top input image 442-1 may be oriented in the same direction without modification of the first top input image 442-1. In contrast, the image capture devices 110 are oriented in opposite directions (e.g., one image capture device 110 is oriented upside down) in the fourth configuration 310-4. Therefore, as illustrated in FIG. 3, a second top input image 442-2 is inverted from the bottom input image 440. To align the second top input image 442-2 with the bottom input image 440, the server 112 may invert or rotate the second top input image 442-2 to be oriented in the same direction as the bottom image 440.

FIG. 4C illustrates determining an offset between a bottom input image 450 and a top input image 452. As illustrated in FIG. 4C, the top input image 452 is shifted horizontally to the left relative to the bottom input image 450. For example, a recognizable pattern of pixels (e.g., a feature point such as the television depicted in the bottom input image 450 and the top input image 452) may be located at first x coordinates ($X_1$) in the bottom input image 450 and a corresponding pattern of pixels may be located at second x coordinates ($X_2$) in the top input image 452. Therefore, the server 112 may determine the offset as a horizontal translation 456 from the second x coordinates to the first x coordinates (e.g., ($X_1$)–($X_2$)). The server 112 may calibrate the top input image 452 using the offset to generate translated image 454, which is aligned with the bottom input image 450.

For ease of explanation, FIG. 4C illustrates the offset as a horizontal translation, but the present disclosure is not limited thereto. Instead, the offset may include a horizontal translation, a vertical translation, a rotation or any combination thereof without departing from the present disclosure. Thus, to calibrate a top input image with a bottom input image, the server 112 may determine if the top input image and/or bottom input image are inverted and determine an offset between the top and bottom input images, which may include horizontal translations, vertical translations and/or rotation. In addition, the offset may vary within the top input image and the server 112 may determine multiple recognizable patterns of pixels (e.g., feature points) in the top input image and the bottom input image to determine multiple offsets for portions of the top input image.

A relationship between image capture devices 110 may be referred to as a Fundamental matrix, which includes the rotation, the translation and the like. In some examples, the server 112 may determine the fundamental matrix using a bundle adjustment optimization method relying on certain a priori known epipolar constrains (e.g., camera planes are parallel to each other, rotation of one camera relative to another is limited to certain angle, etc.). For example, each individual image capture device 110 may determine orientation information using a compass, an accelerometer, inertial unit, and/or the like. Such components may be used to determine rotation changes in a particular image capture device 110, pull of gravity on the particular image capture device 110, etc. The server 112 may align input images between two image capture devices 110 within a few degrees using the orientation information in a first alignment step. In a second alignment step, the server 112 may match the input images using the input images as discussed above. For example, the server 112 may generate a first matrix associated with the bottom input image 450 and a second matrix associated with the top input image 452 and may match the first matrix and the second matrix above a threshold to align the bottom input image 450 and the top input image 452.

In order for the server 112 to stitch first video data from a first image capture device 110-1 and second video data from a second image capture device 110-2, the server 112 needs to determine that the first video data and the second video data are associated. The server 112 may determine that the first video data and the second video data are associated using multiple techniques. As a first example, the first image capture device 110-1 and the second image capture device 110-2 may receive association information and may embed the association information in the first video data and the second video data, as discussed in greater detail below with regard to FIG. 5A. As a second example, the server 112 may know of the association from user input, either directly input to the server 112 or input to a remote device such as the device 102. The user input may indicate that the first video data and the second video data are associated and/or indicate that the first image capture device 110-1 and the second image capture device 110-2 are associated. From the user input, the server 112 may determine the association between the first video data and the second video data, as discussed in greater detail below with regard to FIG. 5B. As a third example, the server 112 may determine that the first video data is associated with the second video data based on the first video data and the second video data and any associated data, as discussed in greater detail below with regard to FIG. 5C.

FIG. 5A illustrates an example of the association between the first video data and the second video data and/or between the first image capture device 110-1 and the second image capture device 110-2 being embedded in the first video data and the second video data. In the example illustrated in FIG. 5A, the device 102 may be paired with each of the first image capture device 110-1 and the second image capture device 110-2, may determine an association between the image capture devices 110 and may send association information to the image capture devices 110. However, this is intended as an illustrative example and the present disclosure is not limited thereto. Instead, the first image capture device 110-1 may be coupled to the second image capture device 110-2 and may determine the association directly, the server 112 may send association information to the image capture devices 110 or a user may input association information directly to the image capture devices 110 without departing from the present disclosure.

As illustrated in FIG. 5A, the device 102 may pair (510) with the first image capture device 110-1 and pair (512) with the second image capture device 110-2. For example, an application running on the device 102 may indicate to a user that the image capture devices 110 are within range and the device 102 may pair with the image capture devices 110 in response to user input. The device 102 may determine (514) an association between the image capture devices 110. For example, the device 102 may display a user interface (UI) and the user may indicate that the image capture devices 110 are physically connected and the video data may be stitched together. The device 102 may send (516) association information to the first image capture device 110-1 and may send (518) the association information to the second image capture device 110-2.

As part of steps 514-518, the device 102 may calibrate the image capture devices 110. For example, the image capture devices 110 may be capable of multiple settings and the first image capture device 110-1 may be programmed with different settings than the second image capture device 110-2. The device 102 may determine desired settings and may calibrate both image capture devices 110 using the desired settings. For example, the device 102 may determine the desired settings based on user input and/or a preview of output data from the image capture devices 110. In some examples, the device 102 may display a preview of the output data to the user and may receive input selecting the desired settings from the user. Additionally or alternatively, the device 102 may determine first settings used by the first image capture device 110-1 and calibrate the second image capture device 110-2 using the first settings. The settings may be calibrated during the initial setup (e.g., calibrated once when the first image capture device 110-1 is associated with the second image capture device 110-2) or dynamically throughout video capture. Examples of settings may include frame rate, International Organization for Standardization (ISO), focal length, digital zoom or the like. In some examples, each of the camera(s) 115 included in the image capture devices 110 may be calibrated using the same settings. In other examples, the settings may vary between the camera(s) 115 but be calibrated between the image capture devices 110. Further, while the calibration between the image capture devices 110 is described with regard to the device 102, the present disclosure is not limited thereto. Instead, in some examples the image capture devices 110 may be calibrated using a remote device (e.g., server 112) or may communicate directly to calibrate settings.

The image capture devices 110 may capture (520) video data and associate (522) the association information with the video data. In a first example, the first image capture device 110-1 may capture first video data and associate the first video data with association information indicating that the first image capture device 110-1 is associated with the second image capture device 110-2. Based on this association, the server 112 may determine that the first video data is associated with video data captured by the second image capture device 110-2. In a second example, the first image capture device 110-1 may capture the first video data and associate the first video data with association information indicating that the first video data is associated with second video data. As the association information explicitly indicates that the first video data is associated with the second video data, the server 112 may stitch the first video data and the second video data without determining a relationship between the first image capture device 110-1 and the second image capture device 110-2. The present disclosure is not limited thereto, and the association information may indicate that the first video data is associated with a particular room, particular network, particular user identification (userID) or the like and the server 112 may associate the first video data with other video data associated with the room, network, userID or the like.

The first image capture device 110-1 may send (524) the first video data to the server 112 and the second image capture device 110-2 may send (526) the second video data to the server 112. The server 112 may determine (528) the association between the first video data and the second video data and may combine (530) the first video data and the second video data together to generate output video data based on the association. As mentioned above, the server 112 may determine the association between the first video data and the second video data using multiple techniques based on what is indicated by the association data. For example, if the association information indicates that the first image capture device 110-1 is associated with the second image capture device 110-2, the server 112 may associate video data captured by the first image capture device 110-1 (including the first video data) with video data captured by the second image capture device 110-2 (including the second video data). The server 112 may determine if timestamps associated with the first video data overlap timestamps associated with the second video data prior to association or during the stitching process. Additionally or alternatively, the if the association information explicitly indicates that the first video data is associated with the second video data, the server 112 may stitch the first video data and the second video data. In some examples, the association information may indicate that the first video data and the second video data are associated with a particular room, network, userID or the like, and the server 112 may associate the first video data and the second video data (along with any additional video data) associated with the room, network, userID or the like.

FIG. 5B illustrates an example of the server 112 receiving association information based on user input. In contrast to FIG. 5A, the image capture devices 110 are not aware of the association and the video data does not include the association information. For ease of explanation, descriptions may be omitted or shortened for steps previously discussed with regard to FIG. 5A.

As illustrated in FIG. 5B, the device 102 may pair (510) with the first image capture device 110-1, pair (512) with the second image capture device 110-2 and determine (514) an association between the image capture devices 110. Instead of sending the association information to the image capture devices 110, the device 102 may send (532) the association information to the server 112.

The image capture devices 110 may capture (520) video data, but unlike FIG. 5A, the image capture devices 110 do not associate the video data with the association information. The first image capture device 110-1 may send (524) the first video data to the server 112 and the second image capture device 110-2 may send (526) the second video data to the server 112. The server 112 may determine (528) the association between the first video data and the second video data, as discussed above, and may combine (530) the first video data and the second video data together to generate output video data based on the association. While FIG. 5B illustrates the server 112 receiving the association information from the device 102, the present disclosure is not limited thereto and the server 112 may receive the association information from user input to the server 112, a remote device or the like without departing from the present disclosure.

Figure 5C:
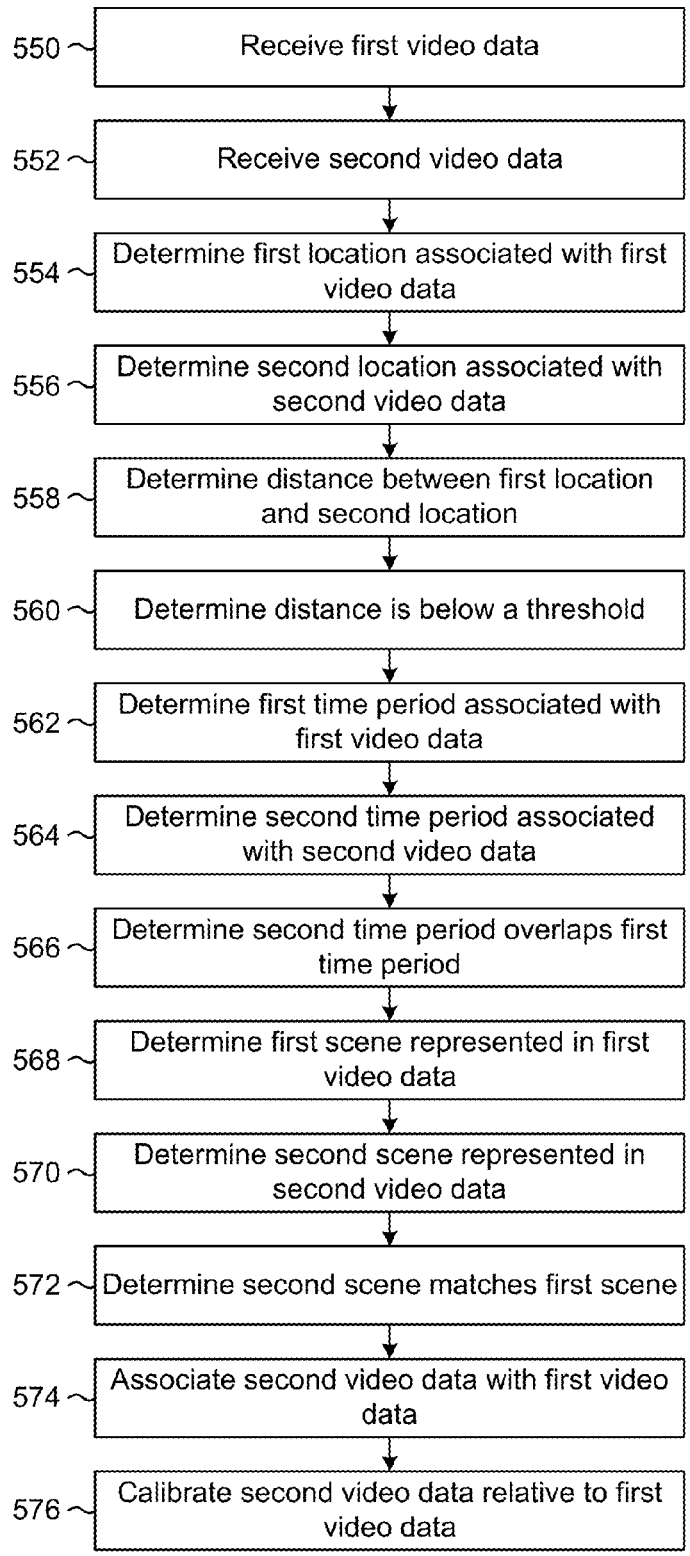

FIG. 5C illustrates an example of the server 112 determining that the first video data is associated with the second video data based on the first video data and the second video data and any associated data. For example, the server 112 may determine that a location and timestamp(s) associated with the first video data match a location and timestamp(s) associated with the second video data. Based on the proximity between the first video data and the second video data in space and time, the server 112 may perform image matching or other techniques to determine if pixel values overlap between the first video data and the second video data.

As illustrated in FIG. 5C, the server 112 may receive (550) the first video data and may receive (552) the second video data. The server 112 may determine (554) a first location associated with the first video data, may determine (556) a second location associated with the second video data, may determine (558) a distance between the first location and the second location and may determine (560) that the distance is below a threshold. For example, the first video data may be associated with geographic information (e.g., embedded in the first video data, included in annotation data associated with the first video data or the like). If geographic information associated with the second video data is within proximity to the geographic information associated with the first video data, the server 112 may determine that the first video data was captured near the second video data and there may be a relationship between the first video data and the second video data.

The server 112 may determine (562) a first time period associated with the first video data, determine (564) a second time period associated with the second video data and determine (566) that the second time period overlaps the first time period. For example, the server 112 may determine the first time period based on timestamps included in the first video data and may determine the second time period based on timestamps included in the second video data. While the first video data and the second video data may be captured from coupled image capture devices 110, the server 112 may determine that the first video data and the second video data are not associated if the timestamps don't align.

In addition to determining a proximity between the first video data and the second video data in space and time, the server 112 may determine if pixels values of the first video data overlaps pixel values of the second video data. For example, the server 112 may determine (568) a first scene represented in first video data, determine (570) a second scene represented in second video data and determine (572) if the second scene matches the first scene. The server 112 may associate (574) the second video data with the first video data and may calibrate (576) the second video data relative to the first video data. For example, the server 112 may determine an offset and whether the second video data is inverted in order to align the calibrated second video data with the first video data.

For ease of explanation, the steps illustrated in FIG. 5C are described with regard to the server 112. However, some or all of the steps illustrated in FIG. 5C may be executed by the device 102, the image capture devices 110, the server 112, a remote device or any combination thereof. In addition, any of the steps illustrated in FIG. 5C may be omitted or reordered without departing from the present disclosure.

Figure 6A:
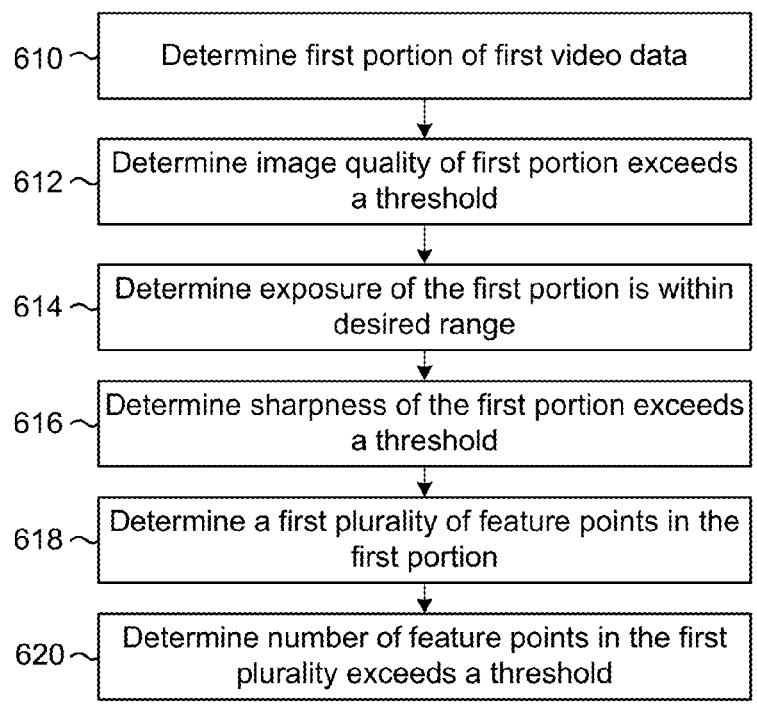

FIGS. 6A-6B illustrate examples of calibrating video data between image capture devices according to embodiments of the present disclosure. As illustrated in FIG. 6A, the server 112 may determine (610) a first portion of the first video data, determine (612) that an image quality of the first portion exceeds a threshold, determine (614) that an exposure of the first portion is within a desired range, determine (616) that a sharpness of the first portion exceeds a threshold, determine (618) a first plurality of feature points (e.g., recognizable pattern of pixels) in the first portion and determine (620) a number of feature points in the first plurality exceeds a threshold. Therefore, the server 112 may determine that the first portion includes pixel data that may be used to calibrate the second video data.

As illustrated in FIG. 6B, the server 112 may select (630) first feature point(s) from the first plurality of feature points to compare to the second video data. The server 112 may optionally determine (632) a first depth associated with the first feature point(s) and optionally determine (634) a second portion of the second video data proximate to edges of the second video data, as indicated by the dashed lines. For example, the server 112 may limit a search area of the second video data to the second portion near the edges as the second video data is more likely to overlap the first video data near the edges. However, the present disclosure is not limited thereto and the second portion may include a majority or an entirety of the second video data without departing from the present disclosure.

The server 112 may determine (636) a second plurality of feature points in the second portion and identify (638) second feature point(s) in the second plurality matching the first feature point(s). For example, the server 112 may use a structural similarity index (SSIM) or the like to match the second feature point(s) to the first feature point(s). The server 112 may optionally determine (640) a second depth associated with the second feature point(s) and determine (642) that the second depth is equal to the first depth. The server 112 may determine (644) a rotation value (e.g., rotation offset value) of the second feature point(s) relative to the first feature point(s), determine (646) a translation value between the first feature point(s) and the second feature point(s) and may calibrate (648) the second video data using the rotation value and the translation value. After calibration, the calibrated second video data may be aligned with the first video data.

FIG. 7 illustrates examples of determining boundaries between overlapping video data according to embodiments of the present disclosure. The examples of boundaries illustrated in FIG. 7 are intended to conceptually illustrate a transition between the first video data and the second video data, but the present disclosure is not limited thereto. Instead, the server 112 may determine the boundary using any techniques known to one of skill in the art and the boundary may not be linear. Additionally or alternatively, the server 112 may generate new pixel values based on pixel values included in the first video data and the second video data without departing from the present disclosure. For example, the server 112 may average pixel values or use other techniques to blend the transition from the first video data to the second video data.

As illustrated in FIG. 7, a first panoramic image 720-1 may be generated using a first top input image 710-1 and a first bottom input image 712-1, with a first boundary 716-1 positioned at a top of an overlap region between the first top input image 710-1 and the first bottom input image 712-1. Thus, the first panoramic image 720-1 may include more of the first bottom input image 712-1 in the overlap region and then transition to the first top input image 710-1 after the first boundary 716-1.

In contrast, a second panoramic image 720-2 may be generated using the first top input image 710-1 and the first bottom input image 712-1, with a second boundary 716-2 positioned at a bottom of the overlap region between the first top input image 710-1 and the first bottom input image 712-1. Thus, the second panoramic image 720-2 may include less of the first bottom input image 712-1 in the overlap region and then transition to the first top input image 710-1 after the second boundary 716-2.

As an alternative, a third panoramic image 720-3 may be generated using the first top input image 710-1 and the first bottom input image 712-1, with a third boundary 716-3 positioned within the overlap region between the first top input image 710-1 and the first bottom input image 712-1 (e.g., equidistant, although the disclosure is not limited thereto). Thus, the third panoramic image 720-3 may include equal amounts of the first bottom input image 712-1 and the first top input image 710-1 in the overlap region.

In some examples, the server 112 may determine the boundary 716 based on objects represented in the video data. For example, the server 112 may generate a fourth panoramic image 720-4 using a second top input image 710-2 and a second bottom input image 712-2, both of which represent portions of an object (e.g., a television). The fourth panoramic image 720-4 may include a fourth boundary 716-4 positioned within the overlap region between the second top input image 710-2 and the second bottom input image 712-2 based on a position of the object. Thus, the server 112 may determine that the object extends from the second bottom input image 712-2 into the overlap region and may select a fourth boundary 716-4 above the object (e.g., positioned above pixels associated with the television).

As another example, the server 112 may generate a fifth panoramic image 720-5 using the second top input image 710-2 and the second bottom input image 712-2, with a fifth boundary 716-5 varying based on a position of the object. Thus, the server 112 may determine that the object extends from the second bottom input image 712-2 into the overlap region in a first area and may position the fifth boundary 716-5 along the bottom of the overlap region except in the first area, where the fifth boundary 716-5 is positioned above the object (e.g., positioned above pixels associated with the television).

As discussed above, the example boundaries 716 are intended to conceptually illustrate the transition and the present disclosure is not limited to the boundaries 716 illustrated in FIG. 7. For example, the boundaries 716 may be non-linear and/or pixel values may be determined using the first video data and the second video data near the boundaries 716.

Figure 8:
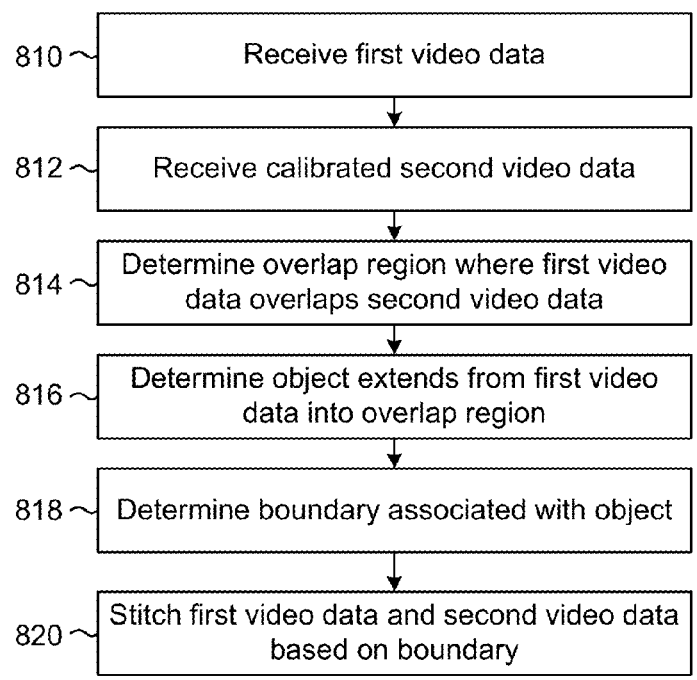
FIG. 8 is a flowchart conceptually illustrating an example method for determining a boundary based on an object according to embodiments of the present disclosure.

FIG. 8 is a flowchart conceptually illustrating an example method for determining a boundary based on an object according to embodiments of the present disclosure. As illustrated in FIG. 8, the server 112 may receive (810) first video data, receive (812) calibrated second video data and determine (814) an overlap region where the first video data overlaps the calibrated second video data. The server 112 may determine (816) that an object extends from the first video data into the overlap region, determine (818) a boundary associated with the object and stitch (820) the first video data and the second video data based on the boundary. For example, the server 112 may determine that the television illustrated in the fifth panoramic image 720-5 extends from the first video data (e.g., the second bottom input image 712-2) into the overlap region and may modify the boundary based on the television.

FIG. 9 illustrates an example of misalignment between image capture devices according to embodiments of the present disclosure. As illustrated in FIG. 9, a misalignment between a first image capture device 110-1 and a second image capture device 110-2 may result in a skew between a top input image 910 and a bottom input image 912. For example, cameras in a first location may be separated by a first distance $D_1$ while cameras in a second location may be separate by a second distance $D_2$, resulting in a first overlap region 914-1 in the first location and second overlap region 914-2 in the second location. As illustrated in FIG. 9, a pixel height of the first overlap region 914-1 is greater than a pixel height of the second overlap region 914-2. As a result of the skew (e.g., difference in distance between $D_1$ and $D_2$ or difference in height between first overlap region 914-1 and second overlap region 914-2), a vertical dimension of a panoramic image 920 is restricted. For example, the height of the first overlap region 914-1 is greater than the height of the second overlap region 914-2 in the first location, which means that the first location has a limited number of vertical rows of pixels relative to the second location. To generate a rectangular panoramic image 920, the server 112 may crop the top input image 910 at the first location by a first number of pixels (e.g., $Y_1$) and at the second location by a second number of pixels (e.g., $Y_2$).

FIG. 10 is a flowchart conceptually illustrating an example method for cropping combined video data to remove skew according to embodiments of the present disclosure. As illustrated in FIG. 10, the server 112 may receive (1010) first video data and receive (1012) calibrated second video data. The server 112 may determine (1014) a first overlap region at a first location and determine (1016) a first height of the first overlap region (e.g., height of the first overlap region 914-1 illustrated in FIG. 9). The server 112 may determine (1018) a second overlap region at a second location and determine (1020) a second height of the second overlap region (e.g., height of the second overlap region 914-2 illustrated in FIG. 9). The server 112 may determine (1022) that the first height is greater than the second height, stitch (1024) the first video data and the second video data and vertically crop (1026) stitched video data based on vertical dimensions at the first location. For example, the server 112 may determine a different between the first height and the second height and vertically crop the stitched video data by the difference at the second location (without cropping the stitched video data at the first location). The output video data (e.g., panoramic image 920) would be rectangular with vertical dimensions based on the limiting factor (e.g., the vertical dimensions at the first location).

FIGS. 11A-11B illustrate examples of combining video data according to embodiments of the present disclosure. In some examples, an image capture device 110 may capture multiple segments of video data (e.g., an image capture device 110 including four cameras may capture four video segments). The segments of video data may be stitched together horizontally for a first image capture device 110, the resulting stitched image stitched together vertically with video data from a second image capture device 110, or the segments of video data may be stitched together horizontally and vertically by the server 112. As illustrated in FIG. 11A, top segments 900 (e.g., segment 1, segment 2, segment 3 and segment 4) may overlap horizontally and be stitched together to make a top input image 910. Similarly, bottom segments 902 (e.g., segment 5, segment 6, segment 7 and segment 8) may overlap horizontally and be stitched together to make a bottom input image 912. The top segments 900 and bottom segments 902 may be stitched together by the device 102, the image capture device 110, the server 112 or the like, although in some examples the top segments 900 and the bottom segments 902 may be stitched together by the image capture device 110 as part of capturing the video data. The top input image 910 may overlap vertically with the bottom input image 912 and may be stitched together to make first panoramic image 920-1. For example, the server 112 may receive the raw top input image 910 and the raw bottom input image 912 and may generate the first panoramic image 920-1. Additionally or alternatively, the device 102 may receive a downsized version (e.g., lower resolution) of the top input image 910 and the bottom input image 912 and may generate the first panoramic image 920-1.

In some examples, the segments of video data may be stitched together horizontally and vertically by the server 112. As illustrated in FIG. 11B, the top segments 900 (e.g., segment 1, segment 2, segment 3 and segment 4) may overlap horizontally, the bottom segments 902 (e.g., segment 5, segment 6, segment 7 and segment 8) may overlap horizontally and the top segments 900 may overlap with the bottom segments 902 vertically. Instead of stitching the top segments 900 together horizontally and stitching the bottom segments 902 together horizontally, the server 112 may stitch the top segments 900 and the bottom segments 902 together concurrently. For example, the server 112 may use the bottom segments 902 when horizontally stitching the top segments 900 and may use the top segments 900 when horizontally stitching the bottom segments 902. Similarly, the server 112 may use the individual video segments when stitching the top segments 900 vertically with the bottom segments 902. Thus, the server 112 may receive the individual video segments and may stitch the individual video segments together to generate the second panoramic image 920-2.

Figure 12B:
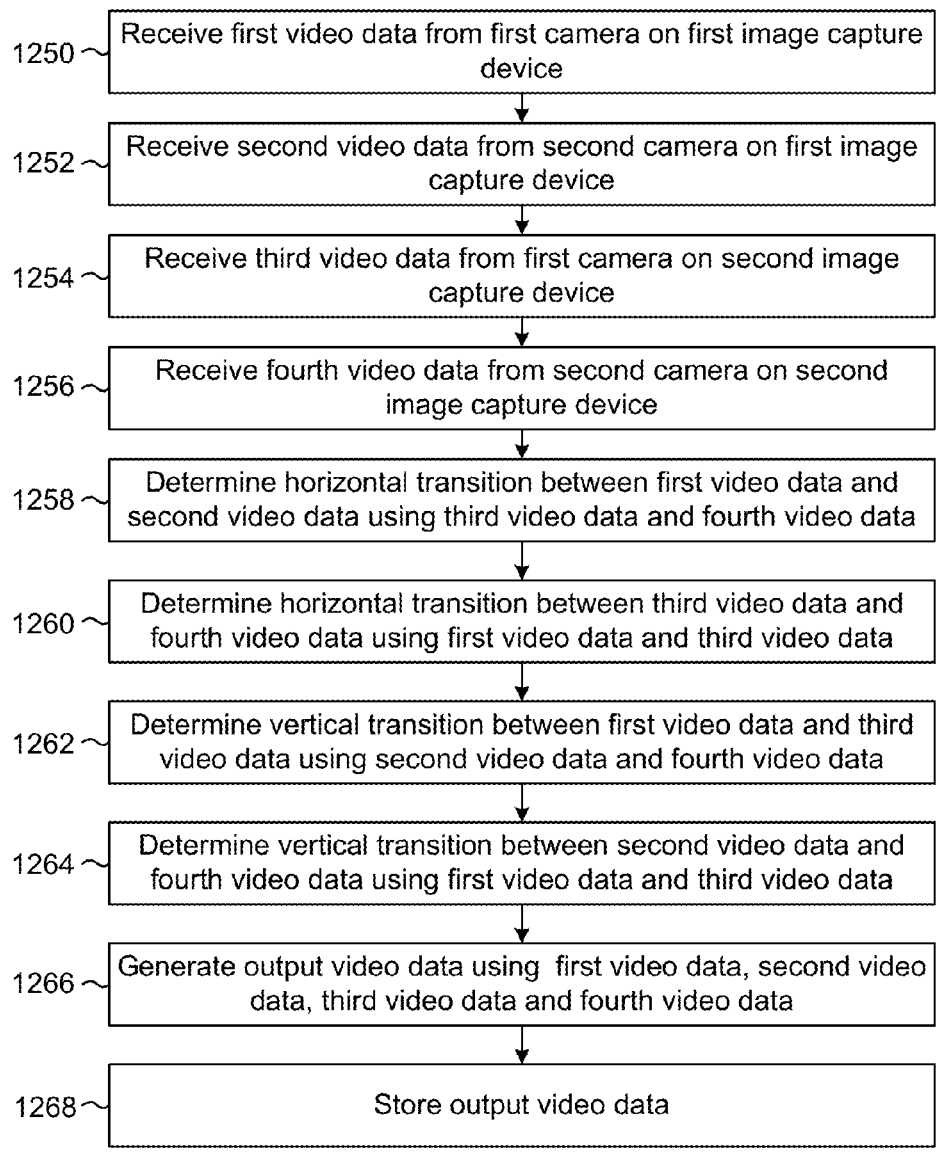

FIGS. 12A-12B are flowcharts conceptually illustrating example methods for combining video data according to embodiments of the present disclosure. As illustrated in FIG. 12A, the server 112 may receive (1210) first video data from a first camera on the first image capture device 110, may receive (1212) second video data from a second camera on the first image capture device, may determine (1214) a horizontal transition between the first video data and the second video data and may generate (1216) a first panoramic video data using the first video data and the second video data. Similarly, the server 112 may receive (1218) third video data from a first camera on a second image capture device, may receive (1220) fourth video data from a second camera on the second image capture device, may determine (1222) a horizontal transition between the third video data and the fourth video data and may generate (1224) second panoramic video data using the third video data and the fourth video data. The server 112 may determine (1226) a vertical transition between the first panoramic video data and the second panoramic video data, may generate (1228) output video data using the first panoramic video data and the second panoramic video data and may store (1230) the output video data. While the abovementioned steps are discussed with regard to the server 112, the device 102 and/or the image capture devices 110 may perform some or all of the steps without departing from the present disclosure.

As illustrated in FIG. 12B, the server 112 may receive (1250) first video data from a first camera on the first image capture device, receive (1252) second video data from a second camera on the first image capture device, may receive (1254) third video data from a first camera on a second image capture device and may receive (1256) fourth video data from a second camera on a second image capture device. The server 112 may determine (1258) a horizontal transition between the first video data and the second video data using the third video data and the fourth video data, determine (1260) a horizontal transition between the third video data and the fourth video data using the first video data and the third video data, determine (1262) a vertical transition between the first video data and the third video data using the second video data and the fourth video data and determine (1264) a vertical transition between the second video data and the fourth video data using the first video data and the third video data. The server 112 may generate (1266) output video data using the first video data, the second video data, the third video data and the fourth video data and may store (1268) the output video data.

Figure 13:
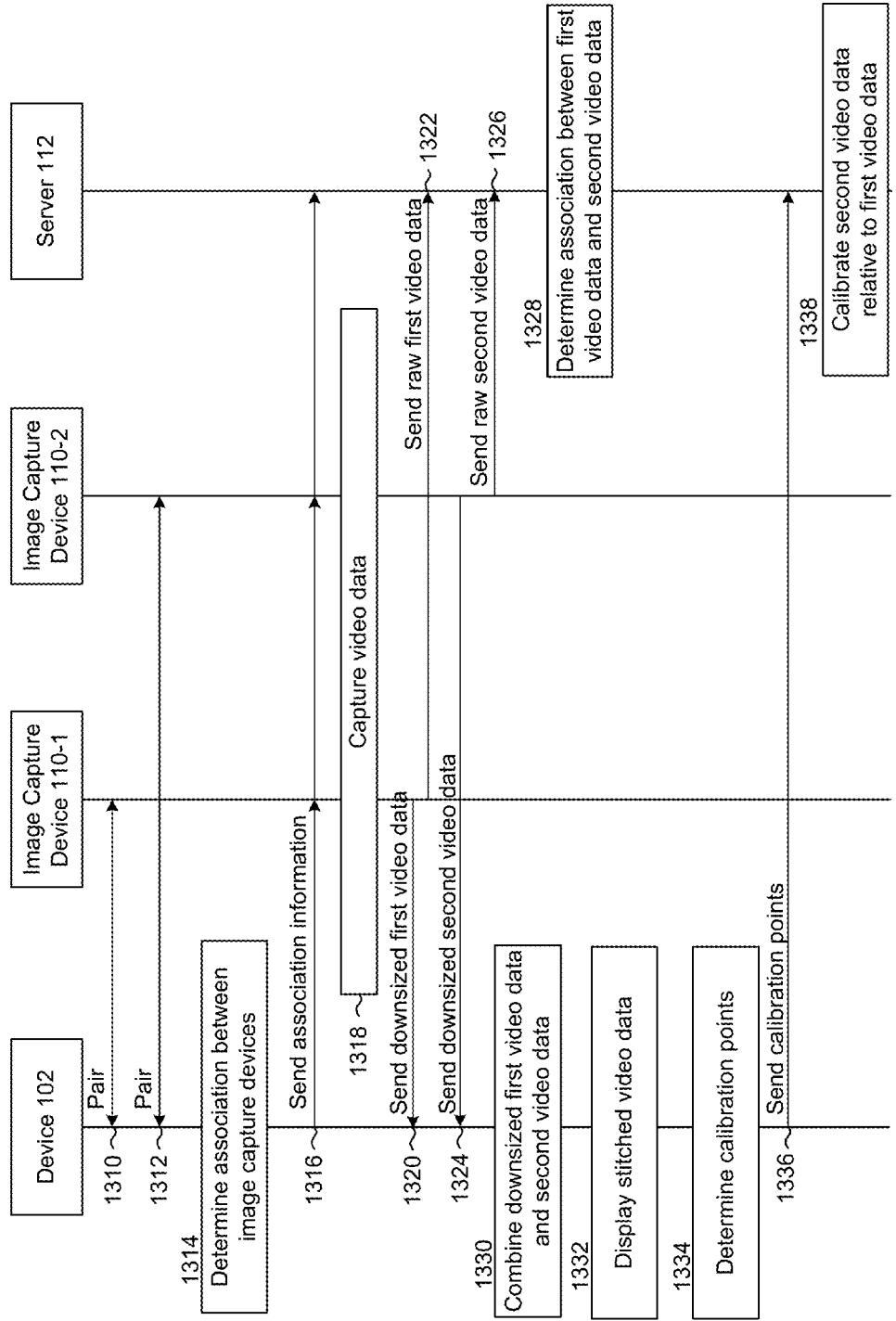
FIG. 13 illustrates a communication diagram conceptually illustrating a companion application assisting calibration according to embodiments of the present disclosure.

FIG. 13 illustrates a communication diagram conceptually illustrating a companion application assisting calibration according to embodiments of the present disclosure. The companion application may be executed on the device 102. For example, a user of the device 102 may use the companion application to communicate with the image capture devices 110 and assist the server 112 in stitching the video data from the image capture devices 110. The companion application may determine an association between the image capture devices 110, may stitch downsized first video data and downsized second video data from the image capture devices 110 and may determine calibration points within the first video data and the second video data to send to the server 112.

As illustrated in FIG. 13, the device 102 may pair (1310) with the first image capture device 110-1, may pair (1312) with the second image capture device 110-2, and may determine (1314) an association between the image capture devices 110. The device 102 may send the association to at least one of the first image capture device 110-1, the second image capture device 110-2 and the server 112. For example, the device 102 may send the association information to the first image capture device 110-1 and the first image capture device 110-1 may associate first video data with second video data captured by the second image capture device 110-2. Alternatively, the device 102 may send the association information to the first image capture device 110-1 and the second image capture device 110-2 and the image capture devices 110 may associate the video data with the other image capture device. In some examples, the device 102 may send the association information to the server 112, without sending the association information to the image capture devices 110. The association information may indicate a particular image capture device 110, particular video data, a particular room, a particular network, a particular userID or the like that the video data is associated with.

The image capture devices 110 may capture (1318) video data. The first image capture device 110-1 may send (1320) downsized first video data to the device 102 and may send (1322) raw first video data to the server 112. For example, the downsized first video data may be a lower resolution than the raw first video data and the downsized first video data may therefore consume fewer processing resources or bandwidth relative to the raw first video data. The second image capture device 110-2 may send (1324) downsized second video data to the device 102 and may send (1326) raw second video data to the server 112. The server 112 may determine (1328) an association between the first video data and the second video data, using techniques similar to those discussed above with regard to FIGS. 5A-5C.

The device 102 may combine (1330) the downsized first video data and the downsized second video data to generate downsized stitched video data. The device 102 may display (1332) the stitched video data to a user, may determine (1334) calibration points based on user input and may send (1336) the calibration points to the server 112. For example, the device 102 may display the stitched video data to a user and the user may select an object within the stitched video data that is included in the overlap region between the first video data and the second video data. The device 102 may then send calibration points associated with the selected object to the server 112 for the server 112 to calibrate the second video data relative to the first video data.

The server 112 may calibrate (1338) the second video data relative to the first video data. For example, the server 112 may determine at least a rotation value and/or translation value, as discussed above with regard to FIGS. 4A-4C. While not illustrated in FIG. 13, after calibrating the second video data the server 112 may stitch the first video data with the calibrated second video data to generate output stitched/combined video data. Thus, the device 102 may generate lower resolution stitched video data relative to the output stitched video data generated by the server 112. The lower resolution stitched video data generated by the device 102 may be displayed to a user during the video capture process, for example to provide a liveview display and/or preview of the stitched video data.

Figure 14:
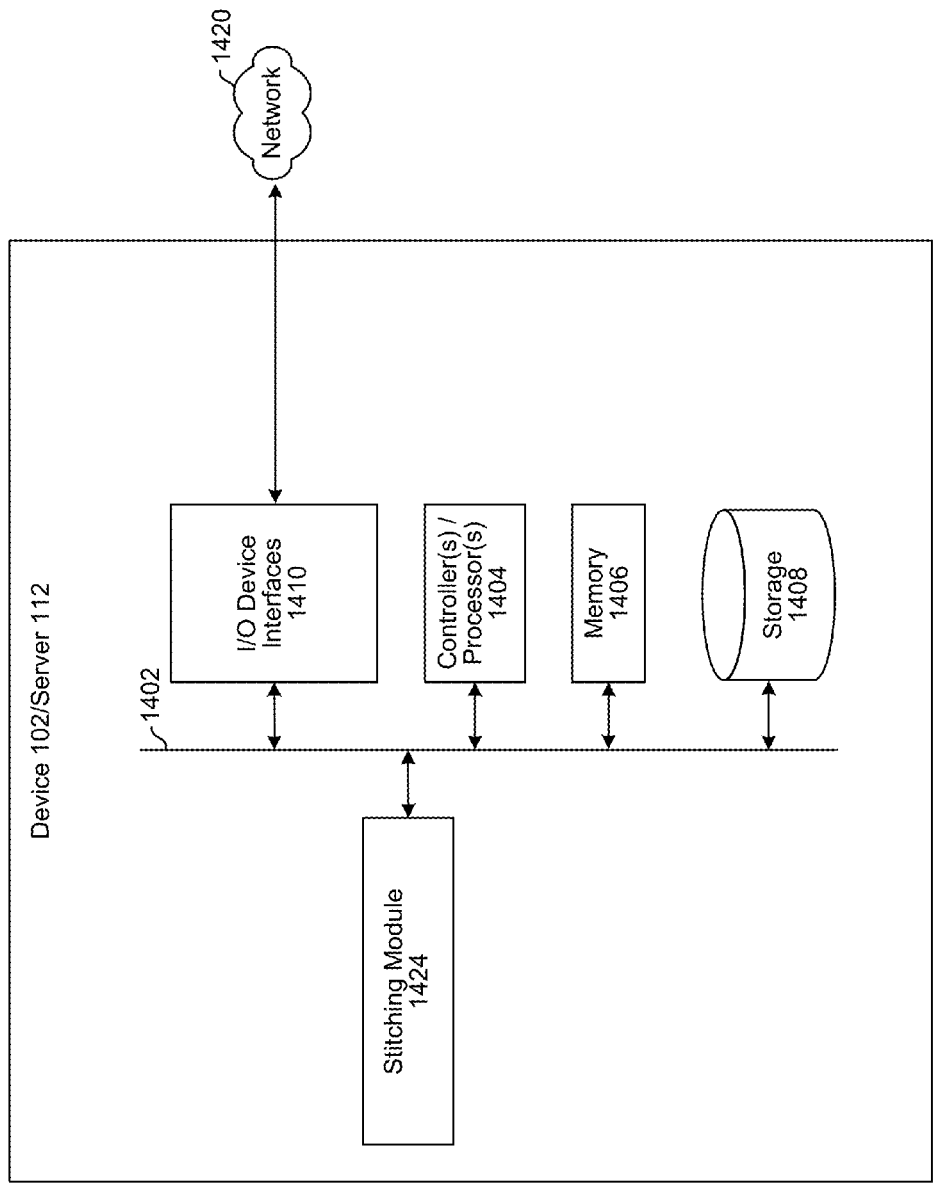
FIG. 14 is a block diagram conceptually illustrating example components of a system according to embodiments of the present disclosure.

FIG. 14 illustrates a block diagram conceptually illustrating example components of a system 100 including one or more of a device 102 and a server 112. Certain components illustrated in FIG. 14 may also be included in an image capture device 110 without departing from the present disclosure. Depending upon how the system is structured, some of the components illustrated in FIG. 14 as part of the device 102 or the server 112 may be included only in the device 102 or in the server 112, or may be distributed across multiple devices 102 and/or servers 112. Other components not illustrated may also be included in the device 102 and/or the server 112. In operation, the system 100 may include computer-readable and computer-executable instructions that reside in storage 1408 on the device 102/server 112. The device 102/server 112 may be an electronic device capable of performing facial recognition and/or speaker recognition. Examples of electronic devices may include computers (e.g., a desktop, a laptop, a server or the like), portable devices (e.g., a camera (such as a 360° video camera), smart phone, tablet or the like), media devices (e.g., televisions, video game consoles or the like) or the like. The device 102/server 112 may also be a component of any of the abovementioned devices or systems.

As illustrated in FIG. 14, the device 102/server 112 may include an address/data bus 1402 for conveying data among components of the device 102. Each component within the device 102/server 112 may also be directly connected to other components in addition to (or instead of) being connected to other components across the bus 1402.

The device 102/server 112 may include one or more controllers/processors 1404 comprising one-or-more central processing units (CPUs) for processing data and computer-readable instructions and a memory 1406 for storing data and instructions. The memory 1406 may include volatile random access memory (RAM), non-volatile read only memory (ROM), non-volatile magnetoresistive (MRAM) and/or other types of memory. The device 102/server 112 may also include a data storage component 1408 for storing data and processor-executable instructions. The data storage component 1408 may include one or more non-volatile storage types such as magnetic storage, optical storage, solid-state storage, etc. The device 102/server 112 may also be connected to a removable or external non-volatile memory and/or storage (such as a removable memory card, memory key drive, networked storage, etc.) through the input/output device interfaces 1410.

The device 102/server 112 includes input/output device interfaces 1410. A variety of components may be connected to the device 102/server 112 through the input/output device interfaces 1410, such as camera(s) 104 and microphone(s) 106. However, the disclosure is not limited thereto and the device 102/server 112 may not include an integrated camera or microphone. Thus, the camera(s) 104, microphone(s) 106 and/or other components may be integrated into the device 102 or may be separate without departing from the disclosure.

The input/output device interfaces 1410 may be configured to operate with a network 1420, for example a wireless local area network (WLAN) (such as WiFi), Bluetooth, zigbee and/or wireless networks, such as a Long Term Evolution (LTE) network, WiMAX network, 3G network, etc. The network 1420 may include a local or private network or may include a wide network such as the internet. Devices may be connected to the network 1420 through either wired or wireless connections.

The input/output device interfaces 1410 may also include an interface for an external peripheral device connection such as universal serial bus (USB), FireWire, Thunderbolt, Ethernet port or other connection protocol that may connect to networks 1420. The input/output device interfaces 1410 may also include a connection to an antenna (not shown) to connect one or more networks 1420 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 102/server 112 further includes a stitching module 1424, which may comprise processor-executable instructions stored in storage 1408 to be executed by controller(s)/processor(s) 1404 (e.g., software, firmware), hardware, or some combination thereof. For example, components of the stitching module 1424 may be part of a software application running in the foreground and/or background on the device 102/server 112. The stitching module 1424 may control the device 102/server 112 (and in some cases, the image capture device 110) as discussed above, for example with regard to FIGS. 1, 5A-5C, 6A-6B, 8, 10, 12A-12B and/or 13. Some or all of the controllers/modules of the stitching module 1424 may be executable instructions that may be embedded in hardware or firmware in addition to, or instead of, software. In one embodiment, the device 102/server 112 may operate using an Android® operating system (such as Android® 4.3 Jelly Bean, Android® 4.4 KitKat or the like) or an Amazon® operating system (such as FireOS or the like).

Executable computer instructions for operating the device 102/server 112 and its various components may be executed by the controller(s)/processor(s) 1404, using the memory 1406 as temporary "working" storage at runtime. The executable instructions may be stored in a non-transitory manner in non-volatile memory 1406, storage 1408, or an external device. Alternatively, some or all of the executable instructions may be embedded in hardware or firmware in addition to or instead of software.

The components of the device(s) 102/server 112, as illustrated in FIG. 14, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

Figure 15:
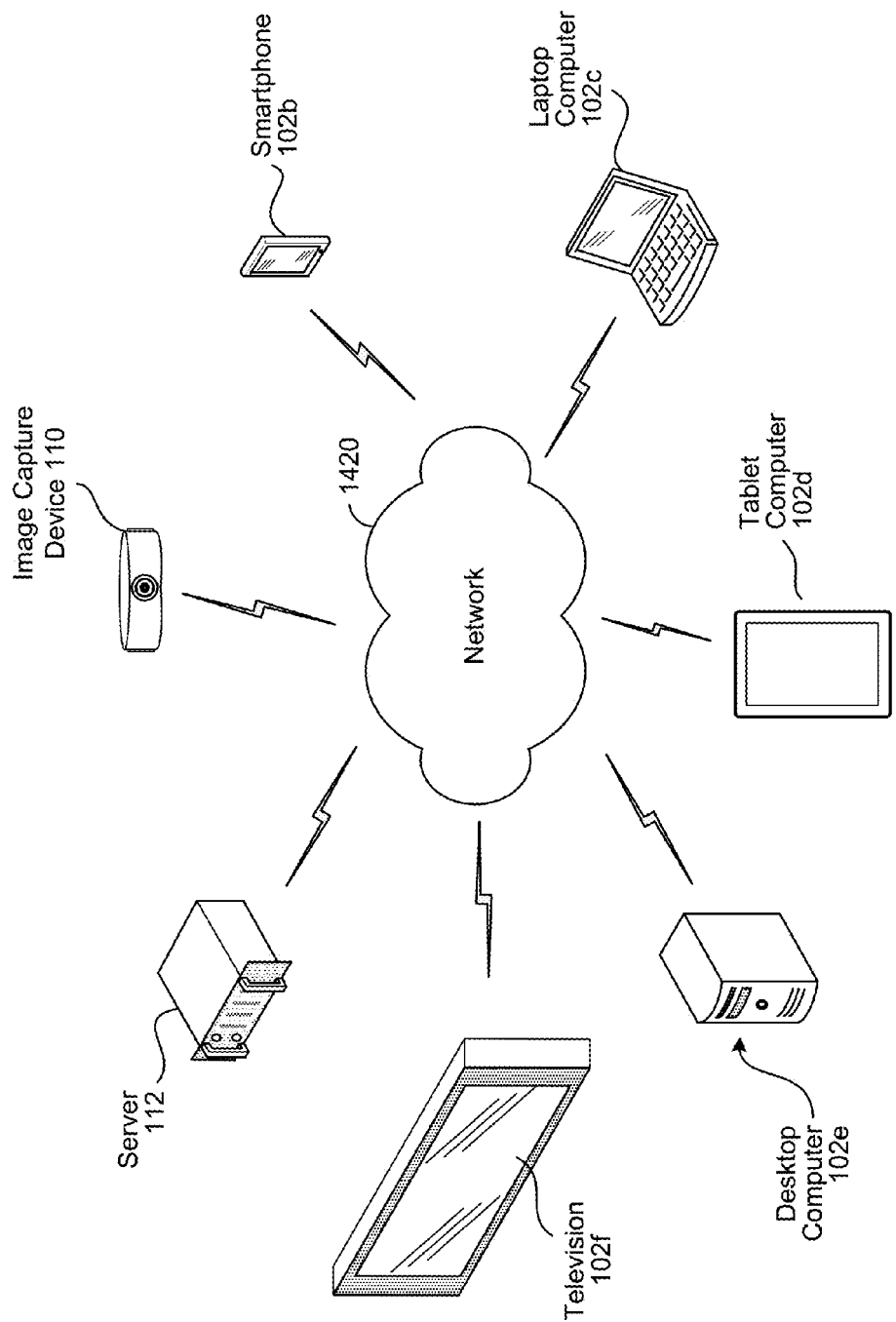
FIG. 15 illustrates an example of a computer network for use with the system.

As shown in FIG. 15, multiple devices may be connected over a network 1420. The network 1420 may include a local or private network or may include a wide network such as the internet. Devices may be connected to the network 1420 through either wired or wireless connections. For example, a smart phone 102b may be connected to the network 1420 through a wireless service provider. Other devices, such as an image capture device 110, laptop computer 102c, tablet computer 102d, desktop computer 102e, television 102f, and/or server 112, may connect to the network 1420 through a wired connection. The server 112 may be configured to receive, store, process and/or stream data related to image data and/or audio data associated with one or more of the image capture device 110, smartphone 102b, laptop computer 102c, tablet computer 102d, desktop computer 102e and television 102f, etc. For example, the server 112 may perform any of the steps described above with regard to FIGS. 1, 6, and/or 9A-9C. Alternatively, the server 112 may receive and store data generated by the v image capture device 110, smartphone 102b, laptop computer 102c, tablet computer 102d, desktop computer 102e, television 102f, etc. using any of the steps described above. Thus, the sever 112 may process and output audio data, image data and/or video data to allow convenient access to any of the devices connected to the server 112.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method of combining video data, comprising:
   receiving first video data captured by a first image capture device, the first video data having a first vertical field of view and an aspect ratio greater than 2:1;
   receiving second video data captured by a second image capture device, the second video data having an aspect ratio greater than 2:1 and the second image capture device offset from the first image capture device in a vertical direction;
   determining a distance between a first location associated with the first image capture device and a second location associated with the second image capture device;
   determining that the distance is below a distance threshold;
   determining that a first period of time associated with the first video data overlaps a second period of time associated with the second video data;
   determining that at least a portion of a first scene represented in the first video data matches at least a portion of a second scene represented in the second video data above a match threshold using a structural similarity index;
   associating the second video data with the first video data;
   determining an orientation of the second image capture device relative to the first image capture device; and
   generating merged video data using the first video data and the second video data, the merged video data having an aspect ratio greater than 2:1 and a second vertical field of view greater than the first vertical field of view.

2. The computer-implemented method of claim 1, wherein the determining the orientation further comprises:
   determining first pixel coordinates associated with a first object represented in the first video data;
   determining second pixel coordinates associated with the first object represented in the second video data;
   determining that the second video data is inverted relative to the first video data using accelerometer data associated with the second image capture device;
   determining a rotation offset value between the second pixel coordinates and the first pixel coordinates;
   determining a translation value between the second pixel coordinates and the first pixel coordinates; and
   generating the merged video data using the rotation offset value and translation value.

3. The computer-implemented method of claim 1, further comprising:
   determining an overlap region, the overlap region corresponding to a first field of view associated with the first video data overlapping a second field of view associated with the second video data in the vertical direction;
   determining that a second object extends from the first video data into the overlap region;
   determining a boundary between the first field of view and the second field of view in the vertical direction using the second object, the determining comprising determining the boundary between the first video data and the second video data in the overlap region; and
   merging the first video data and the second video data based on the boundary.

4. The computer-implemented method of claim 1, further comprising:
   receiving an indication that the first image capture device is associated with the second image capture device;
   sending association information indicating that the first image capture device is associated with the second image capture device;

receiving third video data from the first image capture device, wherein the third video data is a lower resolution version of the first video data;
receiving fourth video data from the second image capture device, wherein the fourth video data is a lower resolution version of the second video data;
generating second merged video data from the third video data and the fourth video data; and
displaying the second merged video data.

5. A computer-implemented method, comprising:
receiving first video data captured by a first image capture device, the first video data corresponding to a first field of view and having an aspect ratio between a first dimension of the first video data in a first direction and a second dimension of the first video data in a second direction greater than 2:1;
receiving second video data captured by a second image capture device, the second video data corresponding to a second field of view and having an aspect ratio between a third dimension of the second video data in the first direction and a fourth dimension of the first video data in the second direction greater than 2:1, the second image capture device being offset from the first image capture device in the second direction;
determining first pixel coordinates associated with a first object represented in the first video data;
determining second pixel coordinates associated with the first object represented in the second video data;
determining an orientation of the second image capture device relative to the first image capture device using at least the first pixel coordinates and the second pixel coordinates; and
generating merged video data including at least a portion of the first video data and the second video data, the merged video data having a third field of view greater than the first field of view in the second direction and greater than the second field of view in the second direction.

6. The computer-implemented method of claim 5, further comprising:
determining a first geographic location associated with first video data;
determining a second geographic location associated with second video data;
determining a distance between the first geographic location and the second geographic location;
determining that the distance is below a threshold;
determining a beginning timestamp associated with the first video data;
determining an ending timestamp associated with the first video data;
determining a first timestamp associated with the second video data;
determining that the first timestamp is between the beginning timestamp and the ending timestamp;
determining a first scene represented in the first video data;
determining a second scene represented in the second video data;
determining that at least a portion of the second scene corresponds to at least a portion of the first scene; and
associating the second video data with the first video data.

7. The computer-implemented method of claim 5, further comprising:
receiving a first indication that the second image capture device is coupled to the first image capture device;
determining a first timestamp associated with the first video data;
determining a second timestamp associated with the second video data;
determining that the second timestamp is equal to the first timestamp;
associating the second video data with the first video data, and
receiving a second indication selecting the first object.

8. The computer-implemented method of claim 5, further comprising:
determining that an image quality of a first portion of the first video data exceeds a first threshold;
determining that an exposure of the first portion is within a desired range;
determining that a sharpness of the first portion exceeds a second threshold;
selecting a first feature point in the first portion as the first object;
determining the first pixel coordinates included in the first feature point;
determining a first depth associated with the first feature point;
identifying a second feature point in the second video data corresponding to the first feature point;
determining the second pixel coordinates included in the second feature point;
determining a second depth associated with the second feature point; and
determining that the second depth is equal to the first depth.

9. The computer-implemented method of claim 5, further comprising:
determining an overlap region, the overlap region corresponding to the first field of view associated with the first video data overlapping the second field of view associated with the second video data in the second direction;
determining that a second object extends from the first video data into the overlap region;
determining a boundary between the first field of view and the second field of view in the second direction using the second object, the determining comprising determining the boundary between the first video data and the second video data in the overlap region; and
merging the first video data and the second video data based on the boundary.

10. The computer-implemented method of claim 5, further comprising:
determining that the second video data is rotated relative to the first video data;
determining a rotation offset value between the second pixels and the first pixels;
determining a translation value between the second pixels and the first pixels; and
generating the merged video data using the rotation offset value and translation value.

11. The computer-implemented method of claim 5, further comprising:
determining a first overlap region, the first overlap region corresponding to the first field of view associated with the first video data overlapping the second field of view associated with the second video data in the second direction by a first pixel height at a first location;
determining a second overlap region, the second overlap region corresponding to the first field of view overlapping the second field of view in the second direction by a second pixel height at a second location, the second location offset from the first location in the first direction;
determining the first pixel height of the first overlap region;
determining the second pixel height of the second overlap region;
determining that the second pixel height is less than the first pixel height;
determining a difference between the first pixel height and the second pixel height; and
cropping the merged video data based on the first pixel height, the cropping further comprising cropping the merged video data in the second direction by the difference at the second location and not cropping the merged video data in the second direction at the first location.

12. The computer-implemented method of claim 5, further comprising:
receiving a first portion of the first video data having a fourth field of view;
receiving a second portion of the first video data having a fifth field of view, the fifth field of view overlapping the fourth field of view in the first direction;
receiving a third portion of the second video data having a sixth field of view, the sixth field of view overlapping the third field of view in the second direction;
receiving a fourth portion of the second video data having a seventh field of view, the seventh field of view overlapping the sixth field of view in the first direction and overlapping the fifth field of view in the second direction; and
determining a boundary between the fourth field of view and the fifth field of view in the first direction using at least one of the sixth field of view and the seventh field of view.

13. A system, comprising:
at least one processor; and
a memory including instructions operable to be executed by the at least one processor to configure the device to perform:
receiving first video data captured by a first image capture device, the first video data corresponding to a first field of view and having an aspect ratio between a first dimension of the first video data in a first direction and a second dimension of the first video data in a second direction greater than 2:1;
receiving second video data captured by a second image capture device, the second video data corresponding to a second field of view and having an aspect ratio greater than 2:1, the second image capture device offset being from the first image capture device in the second direction;
determining first pixel coordinates associated with a first object represented in the first video data;
determining second pixel coordinates associated with the first object represented in the second video data;
determining an orientation of the second image capture device relative to the first image capture device using at least the first pixel coordinates and the second pixel coordinates; and
generating merged video data including at least a portion of the first video data and the second video data, the merged video data having a third field of view greater than the first field of view in the second direction and greater than the second field of view in the second direction.

14. The system of claim 13, wherein the memory further comprises instructions that, when executed by the at least one processor, further configure the system for:
determining a first geographic location associated with first video data;
determining a second geographic location associated with second video data;
determining a distance between the first geographic location and the second geographic location;
determining that the distance is below a threshold;
determining a beginning timestamp associated with the first video data;
determining an ending timestamp associated with the first video data;
determining a first timestamp associated with the second video data;
determining that the first timestamp is between the beginning timestamp and the ending timestamp;
determining a first scene represented in the first video data;
determining a second scene represented in the second video data;
determining that at least a portion of the second scene corresponds to at least a portion of the first scene; and
associating the second video data with the first video data.

15. The system of claim 13, wherein the memory further comprises instructions that, when executed by the at least one processor, further configure the system for:
receiving a first indication that the second image capture device is coupled to the first image capture device;
determining a first timestamp associated with the first video data;
determining a second timestamp associated with the second video data;
determining that the second timestamp is equal to the first timestamp;
associating the second video data with the first video data; and
receiving a second indication selecting the first object.

16. The system of claim 13, wherein the memory further comprises instructions that, when executed by the at least one processor, further configure the system for:
determining that an image quality of a first portion of the first video data exceeds a first threshold;
determining that an exposure of the first portion is within a desired range;
determining that a sharpness of the first portion exceeds a second threshold;
selecting a first feature point in the first portion as the first object;
determining the first pixel coordinates included in the first feature point;
determining a first depth associated with the first feature point;
identifying a second feature point in the second video data corresponding to the first feature point;
determining the second pixel coordinates included in the second feature point;
determining a second depth associated with the second feature point; and
determining that the second depth is equal to the first depth.

17. The system of claim 13, wherein the memory further comprises instructions that, when executed by the at least one processor, further configure the system for:
determining an overlap region, the overlap region corresponding to the first field of view associated with the first video data overlapping the second field of view associated with the second video data in the second direction;

determining that a second object extends from the first video data into the overlap region;

determining a boundary between the first field of view and the second field of view in the second direction using the second object, the determining comprising determining the boundary between the first video data and the second video data in the overlap region; and merging the first video data and the second video data based on the boundary.

18. The system of claim 13, wherein the memory further comprises instructions that, when executed by the at least one processor, further configure the system for:

determining if the second video data is inverted relative to the first video data;

determining a rotation offset value between the second pixels and the first pixels;

determining a translation value between the second pixels and the first pixels; and generating the merged video data using the rotation offset value and translation value.

19. The system of claim 13, wherein the memory further comprises instructions that, when executed by the at least one processor, further configure the system for:

determining a first overlap region, the first overlap region corresponding to the first field of view associated with the first video data overlapping the second field of view associated with the second video data in the second direction by a first pixel height at a first location;

determining a second overlap region, the second overlap region corresponding to the first field of view overlapping the second field of view in the second direction by a second pixel height at a second location, the second location offset from the first location in in the first direction;

determining the first pixel height of the first overlap region;

determining the second pixel height of the second overlap region;

determining that the second pixel height is less than the first pixel height;

determining a difference between the first pixel height and the second pixel height; and cropping the merged video data based on the first pixel height, the cropping further comprising cropping the merged video data in the second direction by the difference at the second location and not cropping the merged video data in the second direction at the first location.

20. The system of claim 13, wherein the memory further comprises instructions that, when executed by the at least one processor, further configure the system for:

receiving a first portion of the first video data having a fourth field of view;

receiving a second portion of the first video data having a fifth field of view, the fifth field of view overlapping the fourth field of view in the first direction;

receiving a third portion of the second video data having a sixth field of view, the sixth field of view overlapping the fourth field of view in the second direction;

receiving a fourth portion of the second video data having a seventh field of view, the seventh field of view overlapping the sixth field of view in the first direction and overlapping the fifth field of view in the second direction; and determining a boundary between the fourth field of view and the fifth field of view in the first direction using at least one of the sixth field of view and the seventh field of view.

* * * * *